US012688654B2

(12) United States Patent
Kang et al.

(10) Patent No.: US 12,688,654 B2
(45) Date of Patent: Jul. 21, 2026

(54) ELECTRONIC DEVICE AND METHOD FOR DISPLAYING CONNECTION STATE IN VIRTUAL ENVIRONMENT

(71) Applicant: SAMSUNG ELECTRONICS CO., LTD., Suwon-si (KR)

(72) Inventors: Doosuk Kang, Suwon-si (KR); Seungnyun Kim, Suwon-si (KR); Dongil Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 145 days.

(21) Appl. No.: 18/662,532

(22) Filed: May 13, 2024

(65) Prior Publication Data

US 2025/0029336 A1 Jan. 23, 2025

Related U.S. Application Data

(63) Continuation of application No. PCT/KR2024/004846, filed on Apr. 11, 2024.

(30) Foreign Application Priority Data

Jul. 19, 2023 (KR) ......................... 10-2023-0093849
Aug. 24, 2023 (KR) ......................... 10-2023-0111452

(51) Int. Cl.
*G06T 19/00* (2011.01)
*G06F 3/01* (2006.01)

(52) U.S. Cl.
CPC .............. *G06T 19/00* (2013.01); *G06F 3/011* (2013.01)

(58) Field of Classification Search
CPC ........ G06T 19/00; G06F 3/011; G06F 1/1698; H04W 4/80
See application file for complete search history.

(56) References Cited

U.S. PATENT DOCUMENTS 10,663,729 B2 5/2020 Kazansky et al.
11,151,801 B2 10/2021 Ahn
(Continued)

FOREIGN PATENT DOCUMENTS

KR 10-1730881 B1 4/2017
KR 10-2017-0125618 A 11/2017
(Continued)

OTHER PUBLICATIONS

International Search Report dated Aug. 12, 2024, issued by the International Searching Authority in International Application No. PCT/KR2024/004846.
(Continued)

*Primary Examiner* — Terrell M Robinson
(74) *Attorney, Agent, or Firm* — Sughrue Mion, PLLC

(57) ABSTRACT

A wearable device comprises a display, a communication circuit, at least one processor, and memory storing instructions. The instructions, when executed by the at least one processor, cause the wearable device to: establish a first connection with a first external electronic device of the plurality of external electronic devices by using the communication circuit; identify a second external electronic device of the plurality of external electronic devices within a field of view of the wearable device; display, through the display, a first visual object representing the first connection, based on identifying an event associated with the first connection; and based on an input obtained for the first visual object for establishing a second connection between the first external electronic device and a second external electronic device, cease displaying of the first visual object and display, through the display, a second visual object representing the second connection.

20 Claims, 19 Drawing Sheets

(56) References Cited

U.S. PATENT DOCUMENTS

| | | | |
|---|---|---|---|
| 11,380,097 B2 | 7/2022 | Bai et al. | |
| 2012/0019662 A1* | 1/2012 | Maltz | G06F 3/013 |
| | | | 348/158 |
| 2016/0274762 A1* | 9/2016 | Lopez | G06T 19/006 |
| 2017/0039868 A1* | 2/2017 | Okumura | G09B 19/0038 |
| 2018/0113508 A1* | 4/2018 | Berkner-Cieslicki | |
| | | | G06F 3/013 |
| 2018/0157398 A1 | 6/2018 | Kaehler et al. | |
| 2021/0158624 A1 | 5/2021 | Moon et al. | |
| 2021/0219132 A1* | 7/2021 | Amin | H04W 4/80 |
| 2022/0206102 A1 | 6/2022 | Brown | |
| 2023/0199328 A1* | 6/2023 | Cho | H04N 25/00 |
| | | | 348/241 |

FOREIGN PATENT DOCUMENTS

| | | | | | |
|---|---|---|---|---|---|
| KR | 10-2020-0027153 A | | 3/2020 | | |
| KR | 10-2021-0063928 A | | 6/2021 | | |
| KR | 20210063928 A | * | 6/2021 | | G06F 3/04883 |
| KR | 10-2022-0009244 A | | 1/2022 | | |
| KR | 10-2022-0067128 A | | 5/2022 | | |
| KR | 20220067128 A | * | 5/2022 | | G06F 3/04815 |
| KR | 10-2022-0088962 A | | 6/2022 | | |
| KR | 10-2409786 B1 | | 6/2022 | | |
| KR | 10-2023-0045928 A | | 4/2023 | | |
| KR | 20230045928 A | * | 4/2023 | | G06T 19/00 |

OTHER PUBLICATIONS

Written Opinion dated Aug. 12, 2024, issued by the International Searching Authority in International Application No. PCT/KR2024/004846.

Eve Dane, "Bluetooth® 5.1—Why you need precise location and direction finding", Aug. 16, 2021, 6 pages, https://www.litepoint.com/ko/blog/bluetooth-5-1.

"How to Determine Bluetooth BLE Beacon Proximity", Silicon Labs, Technical Blog, Aug. 9, 2016, 2 pages, https://community.silabs.com/s/share/a5U1M000000knr2UAA/how-to-determine-bluetooth-ble-beacon-proximity?language=ko.

* cited by examiner

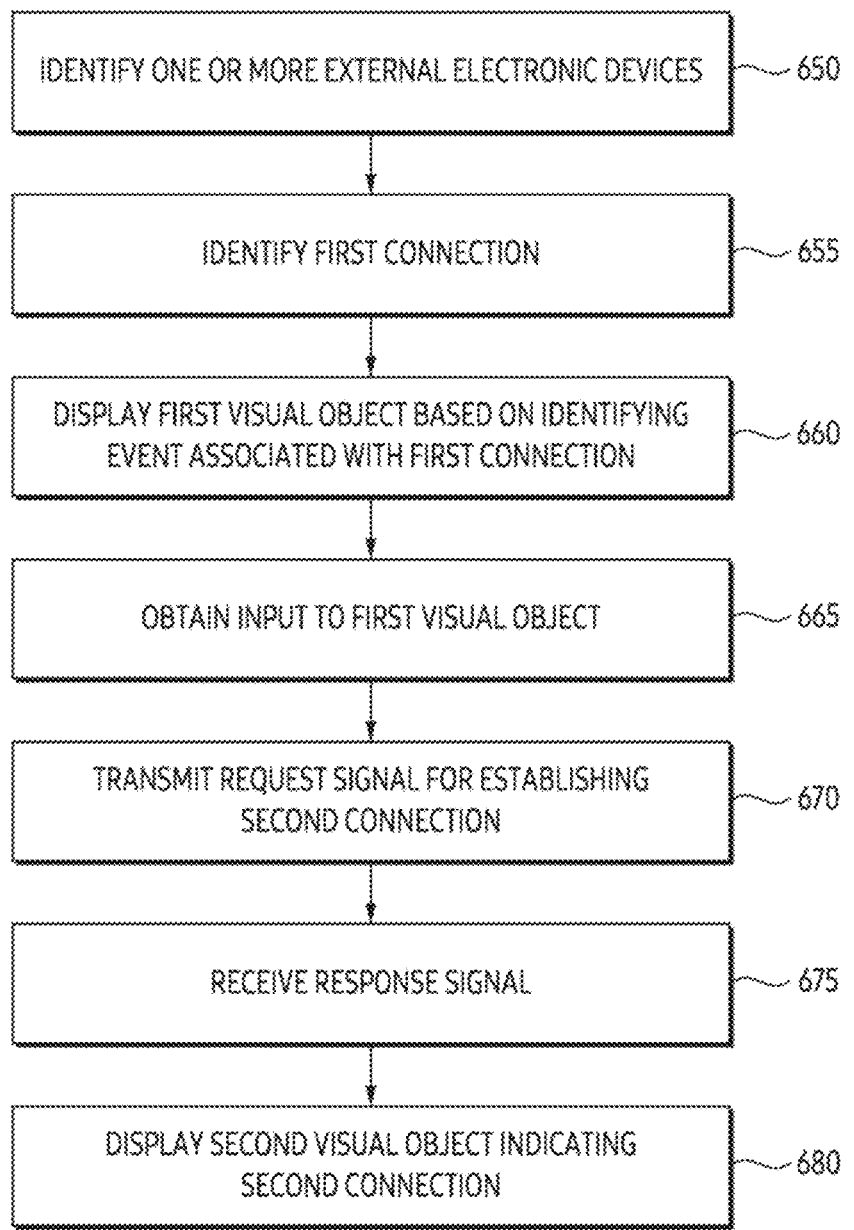

IDENTIFY ONE OR MORE EXTERNAL ELECTRONIC DEVICES ~ 650

IDENTIFY FIRST CONNECTION ~ 655

DISPLAY FIRST VISUAL OBJECT BASED ON IDENTIFYING EVENT ASSOCIATED WITH FIRST CONNECTION ~ 660

OBTAIN INPUT TO FIRST VISUAL OBJECT ~ 665

TRANSMIT REQUEST SIGNAL FOR ESTABLISHING SECOND CONNECTION ~ 670

RECEIVE RESPONSE SIGNAL ~ 675

DISPLAY SECOND VISUAL OBJECT INDICATING SECOND CONNECTION ~ 680

FIG. 6B

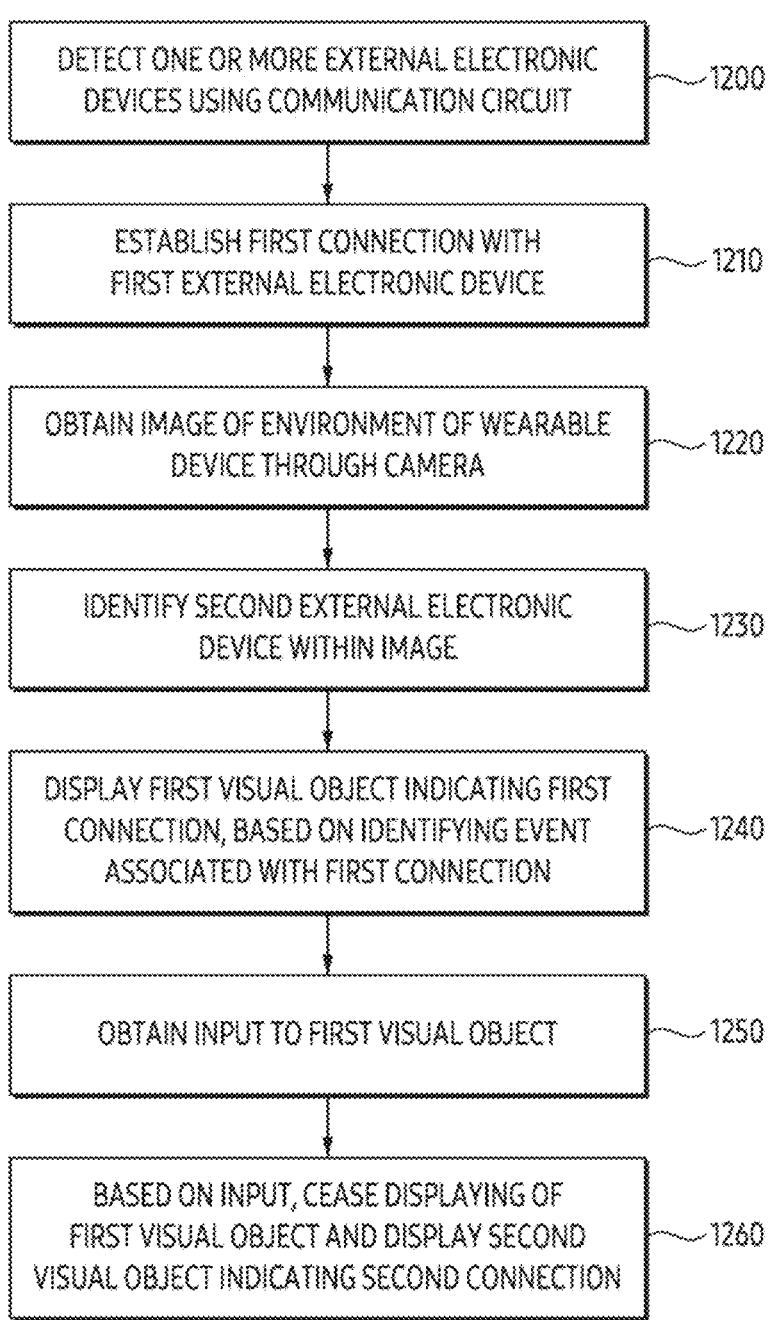

DETECT ONE OR MORE EXTERNAL ELECTRONIC DEVICES USING COMMUNICATION CIRCUIT — 1200

ESTABLISH FIRST CONNECTION WITH FIRST EXTERNAL ELECTRONIC DEVICE — 1210

OBTAIN IMAGE OF ENVIRONMENT OF WEARABLE DEVICE THROUGH CAMERA — 1220

IDENTIFY SECOND EXTERNAL ELECTRONIC DEVICE WITHIN IMAGE — 1230

DISPLAY FIRST VISUAL OBJECT INDICATING FIRST CONNECTION, BASED ON IDENTIFYING EVENT ASSOCIATED WITH FIRST CONNECTION — 1240

OBTAIN INPUT TO FIRST VISUAL OBJECT — 1250

BASED ON INPUT, CEASE DISPLAYING OF FIRST VISUAL OBJECT AND DISPLAY SECOND VISUAL OBJECT INDICATING SECOND CONNECTION — 1260

FIG. 12

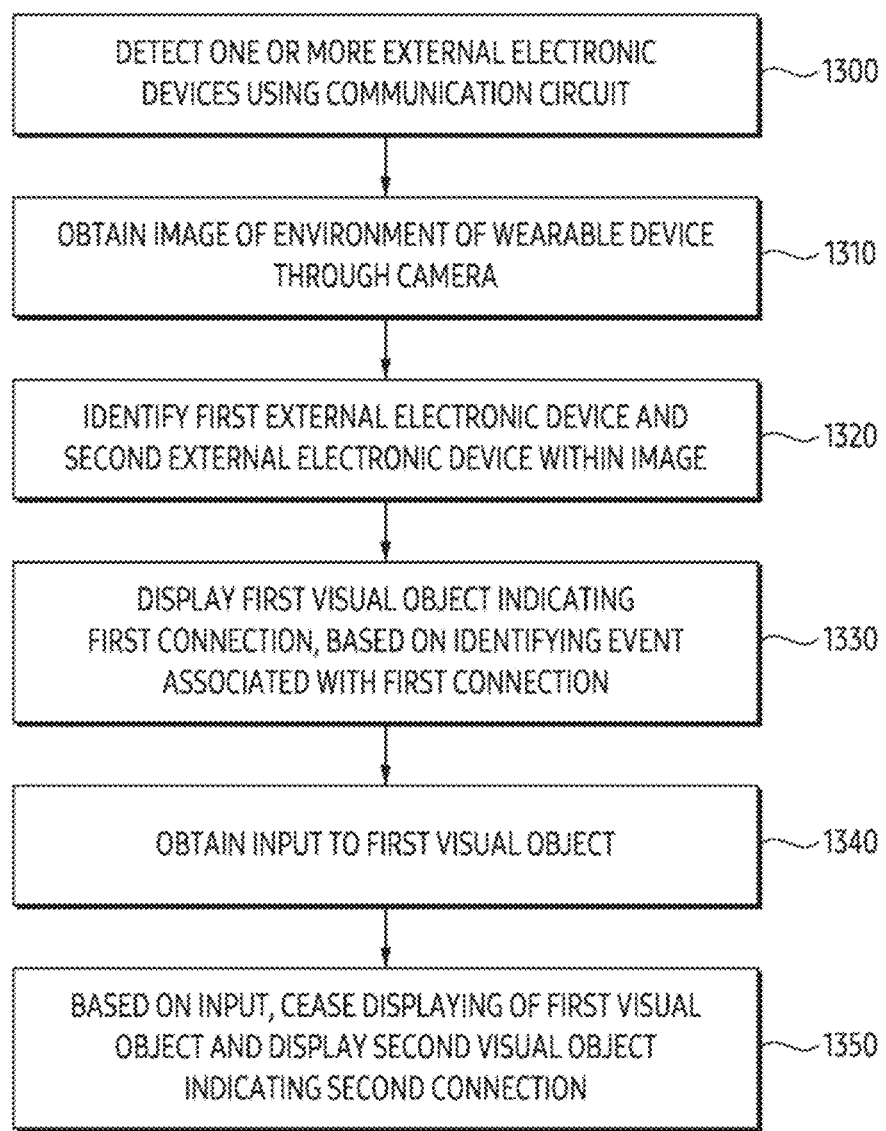

DETECT ONE OR MORE EXTERNAL ELECTRONIC
DEVICES USING COMMUNICATION CIRCUIT — 1300

OBTAIN IMAGE OF ENVIRONMENT OF WEARABLE DEVICE
THROUGH CAMERA — 1310

IDENTIFY FIRST EXTERNAL ELECTRONIC DEVICE AND
SECOND EXTERNAL ELECTRONIC DEVICE WITHIN IMAGE — 1320

DISPLAY FIRST VISUAL OBJECT INDICATING
FIRST CONNECTION, BASED ON IDENTIFYING EVENT
ASSOCIATED WITH FIRST CONNECTION — 1330

OBTAIN INPUT TO FIRST VISUAL OBJECT — 1340

BASED ON INPUT, CEASE DISPLAYING OF FIRST VISUAL
OBJECT AND DISPLAY SECOND VISUAL OBJECT
INDICATING SECOND CONNECTION — 1350

FIG. 13

ELECTRONIC DEVICE AND METHOD FOR DISPLAYING CONNECTION STATE IN VIRTUAL ENVIRONMENT

CROSS-REFERENCE TO RELATED APPLICATIONS

This application is a by-pass continuation application of International Application No. PCT/KR2024/004846, filed on Apr. 11, 2024, which is based on and claims priority to Korean Patent Application Nos. 10-2023-0093849, filed on Jul. 19, 2023, and 10-2023-0111452, filed on Aug. 24, 2023, in the Korean Intellectual Property Office, the disclosures of which are incorporated by reference herein their entireties.

BACKGROUND

1. Field

The disclosure relates to an electronic device for displaying a connection state in a virtual environment and a method therefor.

2. Description of Related Art

In order to provide an enhanced user experience, electronic devices have been developed to provide an extended reality (XR) service (e.g., augmented reality (AR), virtual reality (VR)) for displaying information generated by a computer in association with an external object in a real world or a virtual object in a virtual world. Such an electronic device may include a wearable device that may be worn by a user. For example, the electronic device may include a user equipment (UE), AR glasses, VR glasses, or a head-mounted device (HMD) (e.g., video see-through (VST) HMD or optical see-through (OST) HMD).

SUMMARY

According to an aspect of the disclosure, a wearable device may comprise a display. The wearable device may comprise a communication circuit. The wearable device may comprise a camera. The wearable device may comprise at least one processor comprising processing circuitry. The wearable device may comprise memory, comprising one or more storage mediums, storing instructions. The instructions, when executed by the at least one processor individually or collectively, may cause the wearable device to identify a plurality of external electronic devices using the communication circuit. The instructions, when executed by the at least one processor individually or collectively, may cause the wearable device to establish a first connection with a first external electronic device of the plurality of external electronic devices using the communication circuit. The instructions, when executed by the at least one processor individually or collectively, may cause the wearable device to obtain an image of an environment of the wearable device through the camera. The instructions, when executed by the at least one processor individually or collectively, may cause the wearable device to identify a second external electronic device of the plurality of external electronic devices within the obtained image. The instructions, when executed by the at least one processor individually or collectively, may cause the wearable device to, based on identifying an event associated with the first connection, display, through the display, a first visual object representing the first connection. The instructions, when executed by the at least one processor individually or collectively, may cause the wearable device to obtain an input about the first visual object for establishing a second connection between the first external electronic device and the second external electronic device. The instructions, when executed by the at least one processor individually or collectively, may cause the wearable device to, based on the input, cease displaying of the first visual object and display, through the display, a second visual object representing the second connection.

According to an aspect of the disclosure, a method performed by a wearable device, may comprises identifying a plurality of external electronic devices. The method may comprise establishing a first connection with a first external electronic device of the plurality of external electronic devices. The method may comprise obtaining an image of an environment of the wearable device. The method may comprise identifying a second external electronic device of the plurality of external electronic devices within the obtained image. The method may comprise based on identifying an event associated with the first connection, displaying a first visual object representing the first connection. The method may comprise obtaining an input about the first visual object for establishing a second connection between the first external electronic device and the second external electronic device. The method may comprise based on the input, ceasing displaying of the first visual object and displaying a second visual object representing the second connection.

According to an aspect of the disclosure, a non-transitory computer-readable storage medium, when individually or collectively executed by at least one processor of a wearable device comprising a display, a camera, and a communication circuit, may store one or more programs including instructions that cause to identify a plurality of external electronic devices using the communication circuit. The non-transitory computer-readable storage medium, when individually or collectively executed by the at least one processor, may store one or more programs including instructions that cause to establish a first connection with a first external electronic device of the plurality of external electronic devices using the communication circuit. The non-transitory computer-readable storage medium, when individually or collectively executed by the at least one processor, may store one or more programs including instructions that cause to obtain an image of an environment of the wearable device through the camera. The non-transitory computer-readable storage medium, when individually or collectively executed by the at least one processor, may store one or more programs including instructions that cause to identify a second external electronic device of the plurality of external electronic devices within the obtained image. The non-transitory computer-readable storage medium, when individually or collectively executed by the at least one processor, may store one or more programs including instructions that cause to, based on identifying an event associated with the first connection, display, through the display, a first visual object representing the first connection. The non-transitory computer-readable storage medium, when individually or collectively executed by the at least one processor, may store one or more programs including instructions that cause to obtain an input about the first visual object for establishing a second connection between the first external electronic device and the second external electronic device. The non-transitory computer-readable storage medium, when individually or collectively executed by the at least one processor, may store one or more programs including instructions that cause to based on the input, cease displaying of the first visual object and display, through the display, a second visual object representing the second connection.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 6A and 6B illustrate an example of a method for displaying a visual object representing a connection state with an external electronic device;

FIG. 12 illustrates an example of a method for displaying a visual object representing a connection state between a wearable device and an external electronic device; and FIG. 13 illustrates an example of a method of displaying a visual object representing a connection state between external electronic devices.

DETAILED DESCRIPTION

Figure 1:
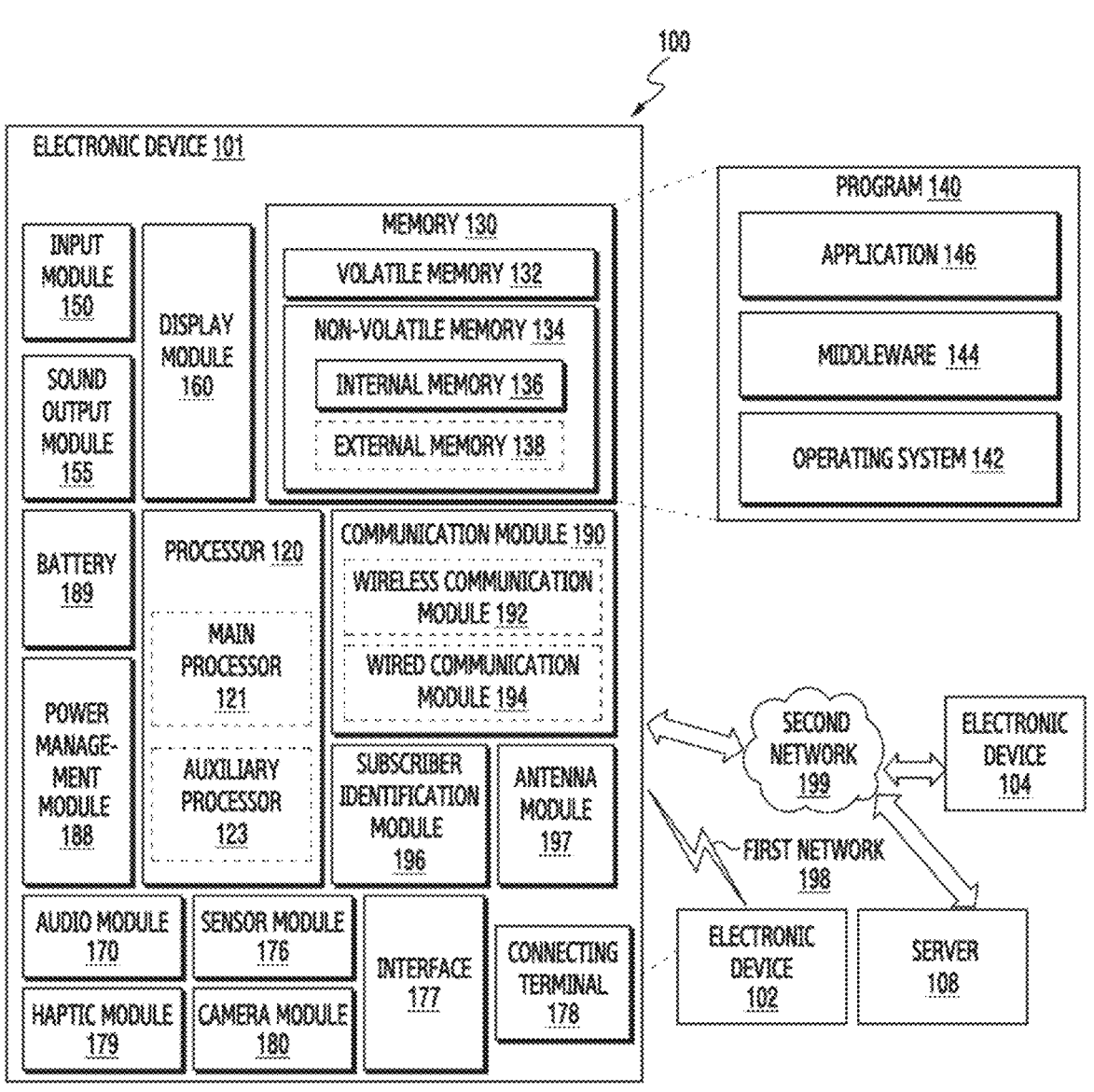
FIG. 1 illustrates a block diagram of an electronic device in a network environment according to one or more embodiments.

The terms used in the disclosure are merely used to better describe a certain embodiment and may not be intended to limit the scope of other embodiments. A singular expression may include a plural expression, unless the context explicitly dictates otherwise. The terms used herein, including technical and scientific terms, may have the same meanings as those commonly understood by those skilled in the art to which the disclosure pertains. Terms defined in a general dictionary among the terms used in the disclosure may be interpreted as having the same or similar meaning as those defined in the context of the related art, and they are not to be construed in an ideal or overly formal sense, unless explicitly defined in the disclosure. In some cases, even the terms defined in the disclosure may not be interpreted to exclude embodiments of the disclosure.

As described herein, in various examples of the disclosure, a hardware approach will be described as an example. However, since one or more embodiments of the disclosure may include a technology that utilizes both the hardware-based approach and the software-based approach, one or more embodiments of the disclosure are not intended to exclude the software-based approach.

Further, throughout the disclosure, an expression such as e.g., 'more than' or 'less than' may be used to determine whether a specific condition is satisfied or fulfilled, but it is merely of a description for expressing an example and is not intended to exclude the meaning of 'more than or equal to' or 'less than or equal to'. A condition described as 'more than or equal to' may be replaced with 'more than', a condition described as 'less than or equal to' may be replaced with 'less than', and a condition described as 'more than or equal to and less than' may be replaced with 'more than and less than or equal to', respectively. Further, hereinafter, 'A' to 'B' may refer to at least one of the elements from A (including A) to B (including B).

The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like.

The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. As an additional example, the expression "at least one of a, b, or c" may indicate only a, only b, only c, both a and b, both a and c, both b and c, all of a, b, and c, or variations thereof. Similarly, the term "set" means one or more. Accordingly, the set of items may be a single item or a collection of two or more items.

FIG. 1 illustrates a block diagram of an electronic device in a network environment according to one or more embodiments.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to address, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to one or more embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another example of the disclosure, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
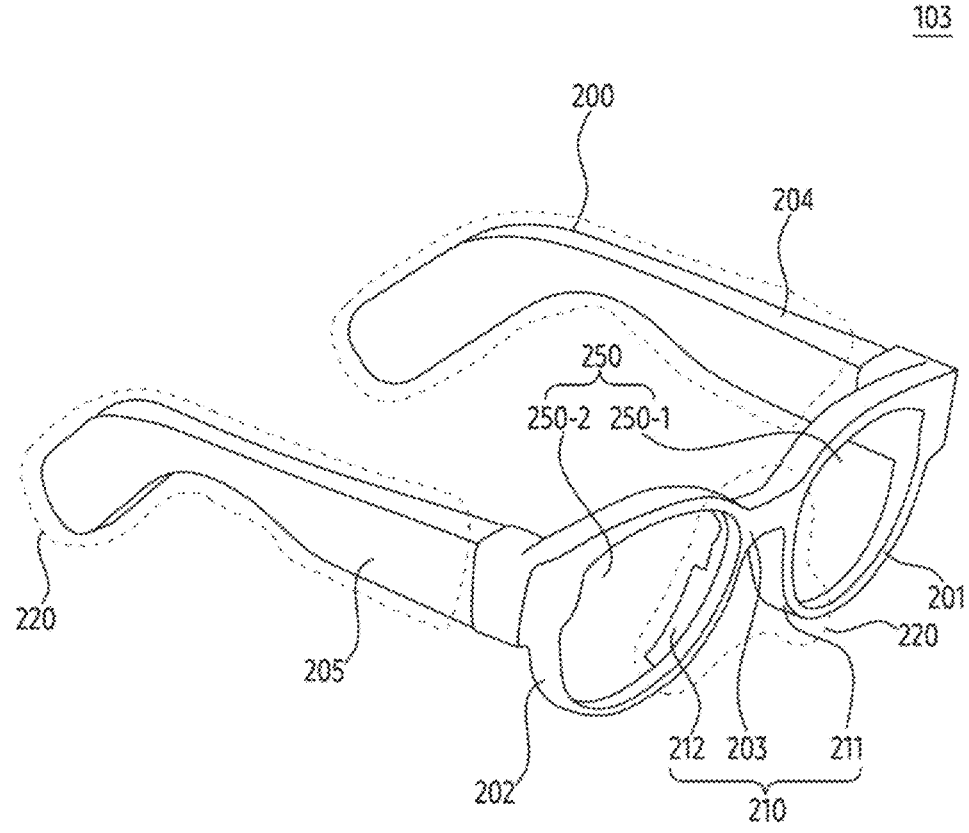
FIG. 2A illustrates an example of a perspective view of a wearable device according to one or more embodiments.
Figure 2B:
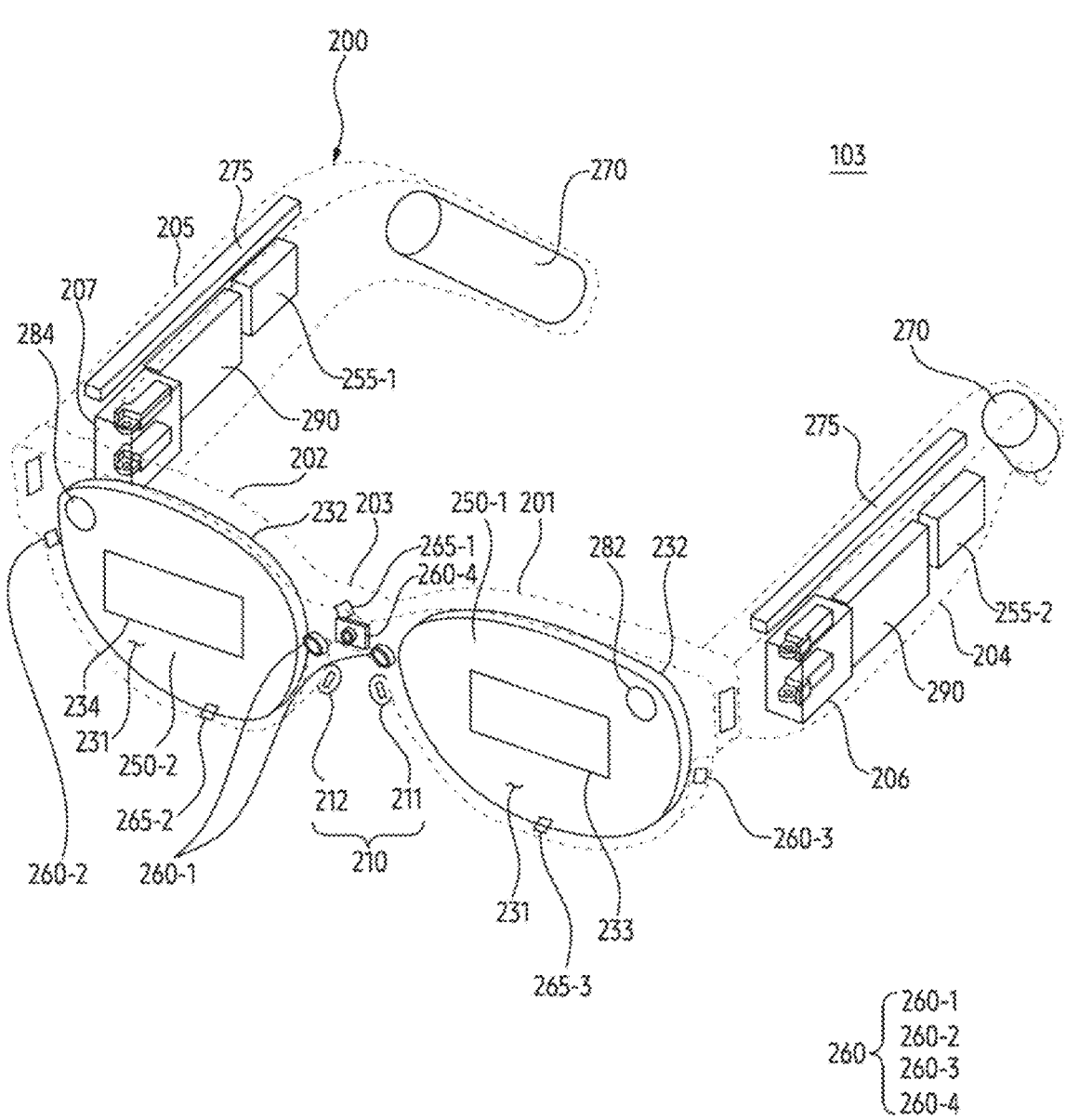
FIG. 2B illustrates an example of one or more hardware components disposed in a wearable device according to one or more embodiments.

FIG. 2A illustrates an example of a perspective view of a wearable device according to one or more embodiments. FIG. 2B illustrates an example of one or more hardware components disposed in the wearable device according to one or more embodiments.

According to an embodiment, the wearable device 103 may have a form of glasses that may be wearable on a user's body part (e.g., head). The wearable device 103 of FIGS. 2A and 2B may be an example of the electronic device 101 of FIG. 1. The wearable device 103 may include a head mounted display (HMD). For example, a housing of the wearable device 103 may include a flexible material such as e.g., rubber and/or silicone that comes into close contact with a portion of the user's head (e.g., a portion of a user's face surrounding both eyes). For example, the housing of the wearable device 103 may include one or more straps that are able to be twined around the user's head, and/or one or more temples that are attachable to and detachable from the ears of the user's head.

Referring to FIG. 2A, according to an embodiment, the wearable device 103 may include at least one display 250 and a frame 200 configured to support the at least one display 250.

According to an embodiment, the wearable device 103 may be worn on a part of the user's body. The wearable device 103 may provide extended reality (XR) to a user wearing the wearable device 103. For example, the extended reality may provide a user with augmented reality (AR), virtual reality (VR), or mixed reality (MR) in which augmented reality and virtual reality are mixed. For example, the wearable device 103 may display, on the at least one display 250, a virtual reality image provided from the at least one optical device 282 or 284 of FIG. 2B, in response to a user's specified gesture obtained through motion recognition cameras 260-2, 263 of FIG. 2B.

According to an embodiment, the at least one display 250 may provide visual information to a user. For example, the at least one display 250 may include a transparent or translucent lens. The at least one display 250 may include a first display 250-1 and/or a second display 250-2 spaced apart from the first display 250-1. For example, the first display 250-1 and the second display 250-2 may be disposed at positions corresponding to the left eye and the right eye of the user, respectively.

Referring to FIG. 2B, the at least one display 250 may provide visual information transmitted from external light and other visual information distinct from the visual information, to the user through a lens included in the at least one display 250. The lens may be formed based on at least one of a Fresnel lens, a pancake lens, or a multi-channel lens. For example, the at least one display 250 may include a first surface 231 and a second surface 232 opposite to the first surface 231. A display area may be formed on the second surface 232 of the at least one display 250. When the user is wearing the wearable device 103, the external light may be incident on the first surface 231 and transmitted through second surface 232 to be transferred to the user. As another example, the at least one display 250 may display, on a display area formed on the second surface 232, an augmented reality image in which a virtual reality image provided from the at least one optical device 282, 284 is provided in combination with a real-world screen transferred with the external light.

In an embodiment, the at least one display 250 may include one or more waveguides 233, 234 that diffract light transmitted from the one or more optical devices 282, 284 to transmit the light to a user. The at least one waveguide 233, 234 may be formed based on at least one of glass, plastic, or polymer. A nano pattern may be formed on an outside or at least a portion of an inside of the one or more waveguides 233, 234. The nano pattern may be formed based on a polygonal and/or curved-surfaced form of grating structure. Light incident on one end of the at least one waveguide 233, 234 may be propagated to the other end of the at least one waveguide 233, 234 by the nano pattern. The at least one waveguide 233, 234 may include at least one of at least one diffractive element (e.g., a diffractive optical element (DOE) or a holographic optical element (HOE)) or a reflective element (e.g., a reflective mirror). For example, the at least one waveguide 233, 234 may be disposed in the wearable device 103 to guide a screen displayed by the at least one display 250 to the eyes of the user. For example, the screen may be transmitted to the user's eyes, based on total internal reflection (TIR) generated in the at least one waveguide 233, 234.

The wearable device 103 may analyze an object included in a real-world image collected through a photographing camera 260-4, combine the analyzed object with a virtual object corresponding to an object to be provided with augmented reality among the analyzed objects, and display the combined virtual object on the at least one display 250. The virtual object may include at least one of a text and an image about various information related to the object included in the real-world image. The wearable device 103 may analyze the object based on a multi-camera such as e.g., a stereo camera. For analyzing the object, the wearable device 103 may execute a spatial recognition (e.g., simultaneous localization and mapping (SLAM)), using a multi-camera and/or a time-of-flight (ToF). The user wearing the wearable device 103 may watch an image displayed on the at least one display 250.

According to an embodiment, the frame 200 may be configured with a physical structure with which the wearable device 103 may be worn on the user's body. According to an embodiment, the frame 200 may be configured such that when the user wears the wearable device 103, the first display 250-1 and the second display 250-2 may be positioned corresponding to the user's left and right eyes, respectively. The frame 200 may support at least one display 250. For example, the frame 200 may support the first display 250-1 and the second display 250-2 to be positioned at positions corresponding to the left eye and the right eye of the user, respectively.

Referring to FIG. 2A, when the user wears the wearable device 103, the frame 200 may include an area 220 at least partially coming into contact with a part of the user's body. For example, the area 220 of the frame 200 in contact with a part of the user's body may include areas in contact with a part of the user's nose, a part of the user's ears, and a part of a side surface of the user's face, by the wearable device 103. According to an embodiment, the frame 200 may include a nose pad 210 contacting a part of the user's body. When the wearable device 103 is worn by the user, the nose pad 210 may be in contact with a part of the user's nose. The frame 200 may include a first temple 204 and a second temple 205 that come into contact with another part of the user's body, which is different from the part of the user's body.

For example, the frame 200 may include a first rim 201 surrounding at least a portion of the first display 250-1, a second rim 202 surrounding at least a portion of the second display 250-2, a bridge 203 disposed between the first rim 201 and the second rim 202, a first pad 211 disposed along a portion of a periphery of the first rim 201 from one end of the bridge 203, a second pad 212 disposed along a portion of a periphery of the second rim 202 from the other end of the bridge 203, a first temple 204 extending from the first rim 201 and fixed to a part of a wearer's ear, and a second temple 205 extending from the second rim 202 and fixed to a part of another ear opposite to the wearer's ear. The first pad 211 and the second pad 212 may be in contact with a part of the user's nose, and the first temple 204 and the second temple 205 may be in contact with a part of the user's face and a part of the user's ear. The temples 204 and 205 may be rotatably connected to the rim by means of hinges 206 and 207 of FIG. 2B. The first temple 204 may be rotatably connected to the first rim 201 via the first hinge 206 disposed between the first rim 201 and the first temple 204. The second temple 205 may be rotatably connected to the second rim 202 via the second hinge 207 disposed between the second rim 202 and the second temple 205. According to an embodiment, the wearable device 103 may identify an external object (e.g., a user's fingertip) touching the frame 200 and/or a gesture performed by the external object, using a touch sensor, a grip sensor, and/or a proximity sensor formed on at least a portion of a surface of the frame 200.

According to an embodiment, the wearable device 103 may include hardware (e.g., hardware components to be described later referring to FIG. 5) that performs various functions. For example, the hardware may include a battery module 270, an antenna module 275, at least one optical device 282, 284, speakers (e.g., speakers 255-1, 255-2), a microphone (e.g., microphones 265-1, 265-2, 265-3), a light emitting module, and/or a printed circuit board (PCB) 290. Various hardware components may be disposed within the frame 200.

According to an embodiment, a microphone (e.g., the microphones 265-1, 265-2, 265-3) of the wearable device 103 may be disposed on at least a portion of the frame 200 to obtain sound signals. Although FIG. 2B illustrates a first microphone 265-1 disposed on the bridge 203, a second microphone 265-2 disposed on the second rim 202, and a third microphone 265-3 disposed on the first rim 201, the number and arrangement of the microphones 265 are not limited to the embodiment of FIG. 2B. When the number of microphones 265 included in the wearable device 103 is two or more, the wearable device 103 may identify a direction of the sound signal using a plurality of microphones disposed on different portions of the frame 200.

According to an embodiment, the at least one optical device 282, 284 may project a virtual object onto the at least one display 250 to provide a user with various image information. For example, the at least one optical device 282, 284 may be a projector. The at least one optical device 282, 284 may be disposed adjacent to the at least one display 250 or may be incorporated in the at least one display 250 as a part of the at least one display 250. According to an embodiment, the wearable device 103 may include a first optical device 282 corresponding to the first display 250-1 and a second optical device 284 corresponding to the second display 250-2. For example, the at least one optical device 282, 284 may include the first optical device 282 disposed at a periphery of the first display 250-1 and the second optical device 284 disposed at a periphery of the second display 250-2. The first optical device 282 may transmit light to a waveguide 233 disposed on the first display 250-1, and the second optical device 284 may transmit light to a second waveguide 234 disposed on the second display 250-2.

In an embodiment, the camera 260 may include a photographing camera 260-4, an eye tracking camera (ET CAM) 260-1, and/or motion recognition cameras 260-2, 260-3. The photographing camera 260-4, the eye tracking camera 260-1, and the motion recognition cameras 260-2, 260-3 may be disposed at different positions on the frame 200 and may perform different functions. The eye tracking camera 260-1 may output data representing a position or a gaze of eyes of the user wearing the wearable device 103. For example, the wearable device 103 may detect the gaze from an image including the user's pupil, which is obtained through the eye tracking camera 260-1. The wearable device 103 may perform a gaze interaction with at least one object, using the user's gaze obtained through the eye tracking camera 260-1. The wearable device 103 may represent a portion corresponding to eyes of an avatar representing the user in a virtual space, using the user's gaze obtained through the eye tracking camera 260-1. The wearable device 103 may render an image (or a screen) displayed on the at least one display 250, based on the position of the user's eyes. For example, the visual qualities (e.g., resolution, brightness, chroma, grayscale, PPI, etc.) of a first region related to the gaze in the image and a second region distinguished from the first region may be different from each other. For example, when the wearable device 103 supports an iris recognition function, a user authentication may be performed based on iris information obtained using the eye tracking camera 260-1. While an example in which the eye tracking camera 260-1 is disposed toward the user's right eye is illustrated in FIG. 2B, the embodiment is not limited thereto, and the eye tracking camera 260-1 may be disposed alone toward the user's left eye or may be disposed toward both the eyes.

In an embodiment, the photographing camera 260-4 may capture a real-world image or a background image to be combined with a virtual image to implement augmented reality or mixed reality contents. The photographing camera 260-4 may capture an image of a particular object present at a position viewed by the user and provide the captured image to the at least one display 250. The at least one display 250 may display one image in which information on the real-world image or the background image including the image of the particular object obtained using the photographing camera 260-4 is superimposed with a virtual image provided through the at least one optical device 282, 284. The wearable device 103 may compensate for depth information (e.g., a distance between the wearable device 103 and the external object obtained through a depth sensor), using the image obtained through the photographing camera 260-4. The wearable device 103 may perform an object recognition through the image obtained using the photographing camera 260-4. While displaying a screen representing a virtual space on the at least one display 250, the wearable device 103 may perform a pass-through function for displaying by superimposing an image obtained through the photographing camera 260-4 on at least a portion of the screen. In an embodiment, the photographing camera 260-4 may be disposed on the bridge 203 disposed between the first rim 201 and the second rim 202.

By tracking the gaze of the user wearing the wearable device 103, the eye tracking camera 260-1 may implement more realistic augmented reality by matching the gaze of the user with the visual information provided on the at least one display 250. For example, the wearable device 103 may naturally display, on the at least one display 250, environmental information related to the user's frontal view at the place where the user is located, when the user is looking at the front ahead. The eye-tracking camera 260-1 may be configured to capture an image of the user's pupil, in order to determine the user's gaze. For example, the eye tracking camera 260-1 may receive gaze detection light reflected from the user's pupil and track the user's gaze based on position and movement of the received gaze detection light. In an embodiment, the eye tracking camera 260-1 may be disposed at positions corresponding to the left eye and the right eye of the user. For example, the eye tracking camera 260-1 may be disposed in the first rim 201 and/or the second rim 202 to face a direction in which a user wearing the wearable device 103 is positioned.

The motion recognition cameras 260-2, 264 may recognize movement of the entirety or a part of the user's body, such as the user's torso, hand, or face, to provide a specific event to a screen on the at least one display 250. The motion recognition cameras 260-2, 264 may make a gesture recognition of a motion of the user to obtain a signal corresponding to the motion, and may provide a display corresponding to the signal to the at least one display 250. The wearable device 103 may identify a signal corresponding to the motion and may perform a specified function based on the identification. The motion recognition cameras 260-2, 260-3 may be used to perform a space recognition function using a SLAM and/or a depth map for a 6 degree of freedom pose (6 DoF pose). The wearable device 103 may perform a gesture recognition function and/or an object tracking function, using the motion recognition cameras 260-2, 260-3. In an embodiment, the motion recognition cameras 260-2, 260-3 may be disposed on the first rim 201 and/or the second rim 202.

The cameras 260 included in the wearable device 103 are not limited to the eye tracking cameras 260-1 and the motion recognition cameras 260-2, 260-3 described above. For example, the wearable device 103 may use the camera 260 disposed toward the FoV of the user to identify an external object included in the FoV. Identification of the external object by the wearable device 103 may be performed based on a sensor for identifying a distance between the wearable device 103 and the external object, such as e.g., a depth sensor and/or a time of flight (ToF) sensor. The camera 260 disposed toward the FoV may support an autofocusing function and/or an optical image stabilization (OIS) function. For example, the wearable device 103 may include the camera 260 (e.g., a face tracking (FT) camera) disposed toward the face to obtain an image including the face of the user wearing the wearable device 103.

In an embodiment, the wearable device 103 may further include a light source (e.g., LED) that emits light toward a subject (e.g., a user's eyes or face, and/or an external object in the FoV) captured using the camera 260. The light source may include an infrared wavelength of LEDs. The light source may be disposed in at least one of the frame 200 or the hinge units 206, 207.

According to an embodiment, the battery module 270 may supply electric power to electronic components in the wearable device 103. In an embodiment, the battery module 270 may be disposed in the first temple 204 and/or the second temple 205. For example, the battery module 270 may include a plurality of battery modules 270. The plurality of battery modules 270 may be disposed in the first temple 204 and the second temple 205, respectively. In an embodiment, the battery module 270 may be disposed at an end of the first temple 204 and/or the second temple 205.

The antenna module 275 may transmit a signal or power to an outside of the wearable device 103, or may receive a signal or power from an outside thereof. In an embodiment, the antenna module 275 may be disposed in the first temple 204 and/or the second temple 205. For example, the antenna module 275 may be disposed close to one surface of the first temple 204 and/or the second temple 205.

A speaker 255 may output a sound signal to the outside of the wearable device 103. A sound output module may be referred to as a speaker. In an embodiment, the speaker 255 may be disposed in the first temple 204 and/or the second temple 205 in order to be placed adjacent to the ears of the user wearing the wearable device 103. For example, the speaker 255 may include a second speaker 255-2 disposed within the first temple 204 and adjacent to the left ear of the user, and a first speaker 255-1 disposed within the second temple 205 and adjacent to the right ear of the user.

The light emitting module may include at least one light emitting device. In order to visually provide the user with information on a specific state of the wearable device 103, the light emitting module may emit light of a color corresponding to the specific state or may emit light in a motion corresponding to the specific state. For example, when charging is required, the wearable device 103 may emit red light at regular intervals. In an embodiment, the light emitting module may be disposed on the first rim 201 and/or the second rim 202.

Referring to FIG. 2B, according to an embodiment, the wearable device 103 may include a printed circuit board (PCB) 290. The PCB 290 may be included in at least one of the first temple 204 or the second temple 205. The PCB 290 may include an interposer disposed between at least two sub PCBs. One or more hardware components (e.g., hardware components to be described later with reference to FIG. 5) included in the wearable device 103 may be disposed on the PCB 290. The wearable device 103 may include a flexible PCB (FPCB) for connecting the hardware components to each other.

According to an embodiment, the wearable device 103 may include at least one of a gyro sensor, a gravity sensor, and/or an acceleration sensor, for detecting an orientation of the wearable device 103 and/or a posture of the body part (e.g., head) of the user wearing the wearable device 103. Each of the gravity sensor and the acceleration sensor may measure the gravitational acceleration and/or an acceleration based on designated three-dimensional axes (e.g., x-axis, y-axis, and z-axis) being perpendicular to each other. The gyro sensor may measure an angular velocity in each of the designated three-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 103 may identify a user's motion and/or gesture performed to execute or cease a specific function of the wearable device 103 based on the IMU.

Figure 3A:
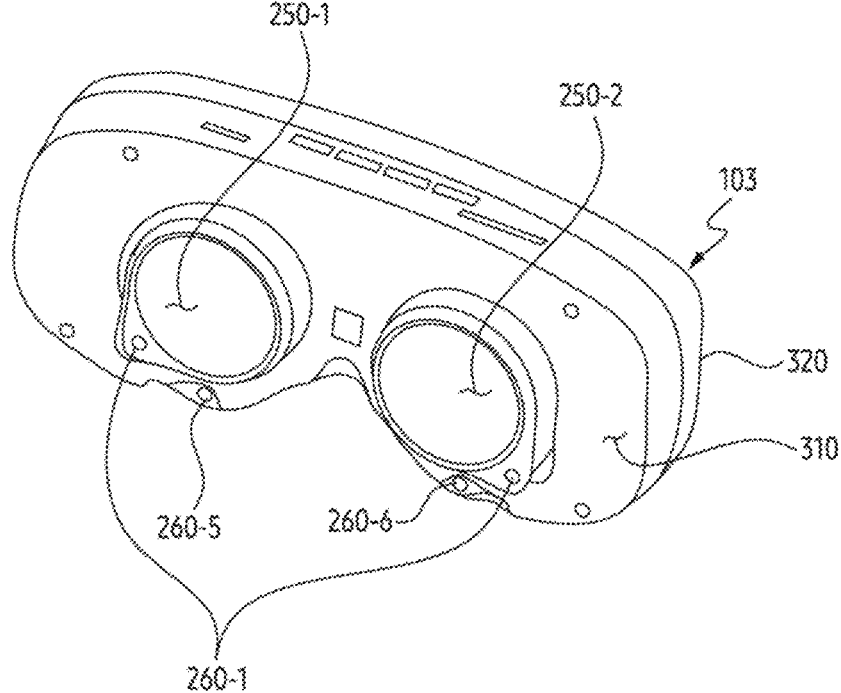
FIGS. 3A and 3B illustrate examples of an appearance of a wearable device according to one or more embodiments.
Figure 3B:
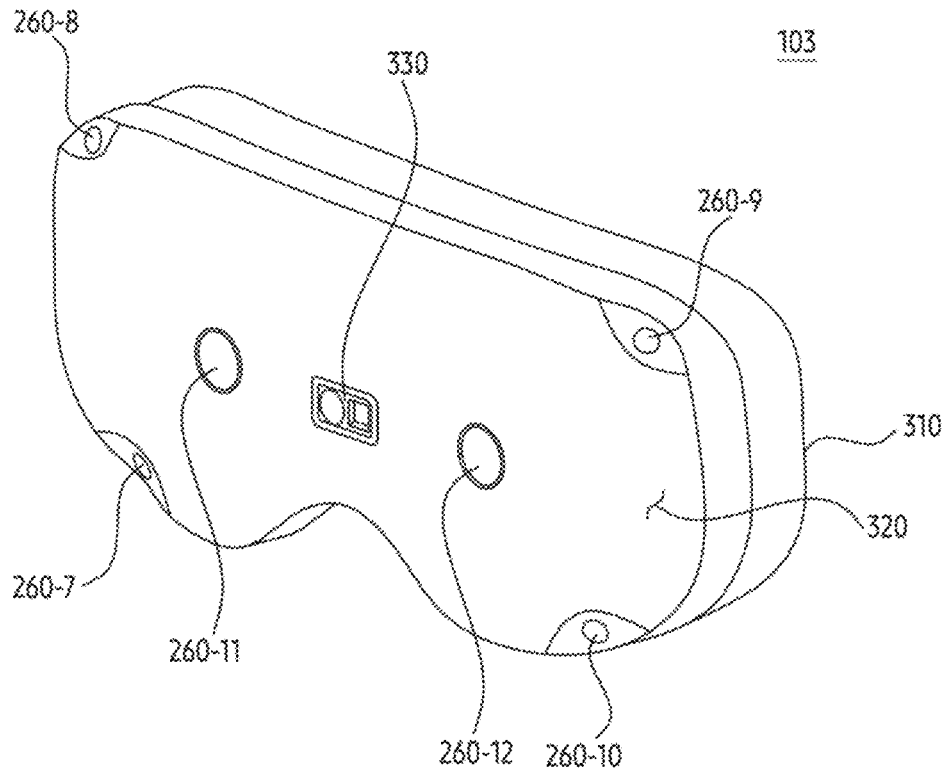

FIGS. 3A and 3B illustrate an example of an appearance of a wearable device according to one or more embodiments.

The wearable device 103 of FIGS. 3A and 3B may be an example of the electronic device 101 of FIG. 1. According to an embodiment, an example of an appearance of a first surface 310 of the housing of the wearable device 103 is illustrated in FIG. 3A, and an example of an appearance of a second surface 320 opposite to the first surface 310 is illustrated in FIG. 3B.

Referring to FIG. 3A, the first surface 310 of the wearable device 103 according to an embodiment may have a shape attachable on a user's body part (e.g., the user's face). The wearable device 103 may further include a strap for fixing on the user's body part and/or one or more temples (e.g., the first temple 204 and/or the second temple 205 of FIGS. 2A and 2B). A first display 250-1 for outputting an image to the left eye of both eyes of the user and a second display 250-2 for outputting an image to the right eye of the both eyes of the user may be disposed on the first surface 310. The wearable device 103 may further include rubber or silicon packing, formed on the first surface 310, to prevent interference by light (e.g., ambient light) different from light radiated from the first display 250-1 and the second display 250-2.

According to an embodiment, the wearable device 103 may include cameras 260-1 for capturing and/or tracking both eyes of the user adjacent to the first display 250-1 and the second display 250-2 respectively. For example, the cameras 260-1 may be referred to as an eye tracking camera. According to an embodiment, the wearable device 103 may include cameras 260-5, 260-6 for capturing and/or recognizing the user's face. The cameras 260-5, 260-6 may be referred to as an FT camera. The wearable device 103 may control the avatar representing the user in the virtual space, based on the motion of the user's face identified using the cameras 260-5, 260-6.

Referring to FIG. 3B, on the second surface 320 opposite to the first surface 310 of FIG. 3A may be disposed cameras (e.g., cameras 260-7, 260-8, 260-9, 260-10, 260-11, 260-12) and/or a sensor (e.g., a depth sensor 330) for obtaining information related to an external environment of the wearable device 103. For example, the cameras 260-7, 260-8, 260-9, 260-10 may be disposed on the second surface 320 to recognize an external object. The cameras 260-7, 260-8, 260-9, 260-10 may be referred to the motion recognition cameras 260-2, 260-3 of FIG. 2B.

For example, using the cameras 260-11, 260-12, the wearable device 103 may obtain an image and/or a video to be transmitted to each of both eyes of the user. The camera 260-11 may be disposed on the second surface 320 of the wearable device 103 to obtain an image to be displayed through the second display 250-2 corresponding to the right eye of both the eyes. The camera 260-12 may be disposed on the second surface 320 of the wearable device 103 to obtain an image to be displayed via the first display 250-1 corresponding to the left eye of both the eyes. The cameras 260-11, 260-12 may be referred to the photographing camera 260-4 of FIG. 2B.

According to an embodiment, the wearable device 103 may include a depth sensor 330 disposed on the second surface 320 to identify a distance between the wearable device 103 and an external object. Using the depth sensor 330, the wearable device 103 may obtain spatial information (e.g., a depth map) about at least a portion of the FoV of the user wearing the wearable device 103. On the second surface 320 of the wearable device 103 may be disposed a microphone for obtaining a sound output from an external object. The number of microphones may be one or more depending upon an embodiment.

The electronic device may establish a connection with one or more external electronic devices based on a designated communication technique. For example, the communication technique may include short-range communication. The short-range communication may be utilized for the electronic device. For example, the short-range communication may include Bluetooth (BT), Bluetooth low energy (BLE), wireless fidelity (Wi-Fi), or ultra-wideband (UWB). A connection between the electronic devices using the short-range communication may be established based on manipulation (or control) of the electronic device. For example, for a BT connection between a smartphone and a headset, the connection may be established by enabling the BT function on both devices to select the device identified according to a result of scanning. In addition, when the device to be connected is already connected to another device, it may be quite cumbersome to terminate the connection between the previously connected devices and perform an operation to connect to a new connection.

The electronic device and method according to embodiments of the disclosure, in the wearable device 103 providing extended reality, may provide a visual representation of a connection state to a user of the wearable device 103, by displaying a visual object (e.g., an image or an animation) for the connection state (or connection information) between an external electronic device and the wearable device 103 or between the external electronic devices. Further, the electronic device and method according to embodiments of the disclosure may cause the connection state to be changed, based on obtaining a user input about the visual object. Accordingly, the electronic device and method according to embodiments of the disclosure may improve usability in an XR environment and provide a user with an immersive user experience by processing the user input.

Figure 4A:
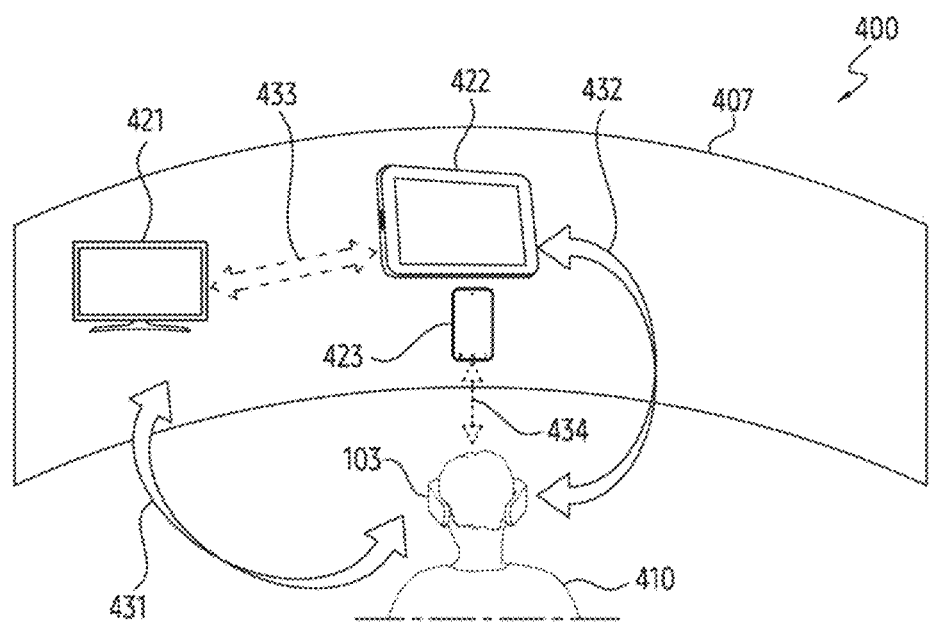
FIG. 4A illustrates an example of a method for displaying a visual object representing a connection state between a wearable device and an external electronic device.

FIG. 4A illustrates an example of a method of displaying a visual object representing a connection state between a wearable device and an external electronic device.

The wearable device 103 of FIG. 4A may illustrate an example of the electronic device 101 of FIG. 1. FIG. 4A illustrates an embodiment 400 of the wearable device 103 being connected with a plurality of external electronic devices 421 (a television), 422 (a tablet), 423 (a smartphone).

Referring to the embodiment 400, the wearable device 103 may identify a plurality of external electronic devices 421, 422, 423. For example, the wearable device 103 may identify a plurality of external electronic devices 421, 422, 423 within a field of view (FOV) 407 of the wearable device 103. However, embodiments of the disclosure are not limited thereto. The FoV 407 of the wearable device 103 may include a real environment (e.g., an AR environment) viewed through a camera of the wearable device 103 or an image (e.g., a VR environment) rendered for the real environment. For example, the wearable device 103 may identify a plurality of external electronic devices based on a communication circuit (e.g., the communication module 190 of FIG. 1) included in the wearable device 103. The plurality of external electronic devices may include a plurality of external electronic devices 421, 422, 423. For example, the wearable device 103 may identify the plurality of external electronic devices based on the communication circuit, and may identify the plurality of external electronic devices 421, 422, 423 within the FoV 407 among the plurality of external electronic devices.

For example, short-range communication may be used to identify the plurality of external electronic devices based on the communication circuit. For example, the short-range communication may include Bluetooth (BT), Bluetooth low energy (BLE), wireless fidelity (Wi-Fi), or ultra-wideband (UWB). However, embodiments of the disclosure are not limited thereto. For example, the wearable device 103 may identify the plurality of external electronic devices based on wireless communication or wired communication technology different from the short-range communication. The identification of the plurality of external electronic devices may be referred to as searching, discovering, detecting, or scanning the plurality of external electronic devices.

Referring to the embodiment 400, the wearable device 103 may establish a connection with at least one external electronic device of the plurality of external electronic devices 421, 422, 423. For example, the wearable device 103 may establish a connection with the external electronic device 421 and the external electronic device 422. For example, the wearable device 103 may not establish a connection with the external electronic device 423. In other words, even if the wearable device 103 identifies the external electronic device 423, the wearable device 103 may not establish a connection with the identified external electronic device 423. In the above embodiment, some external electronic devices are connected to the wearable device 103, but embodiments of the disclosure are not limited thereto.

According to an embodiment, the wearable device 103 may display a visual object representing a connection state. For example, the wearable device 103 may display a visual object 431 indicating a connection established with the external electronic device 421. For example, the wearable device 103 may display, through a display (e.g., the display module 160 of FIG. 1), a visual object 431 indicating the connection between the wearable device 103 and the external electronic device 423. For example, when the screen displayed through the display is a third person viewpoint, the visual object 431 (e.g., a line with start/end arrows) may be displayed in between the user 410 (or the wearable device 103) wearing the wearable device 103 and the external electronic device 421. The screen may include extended reality (e.g., virtual reality, augmented reality, or mixed reality) provided through the wearable device 103. Alternatively, for example, when the screen displayed through the display is a first person viewpoint, the visual object 431 may be displayed extending from the external electronic device 421 to a point where the screen begins. FIG. 4A illustrates the third person viewpoint, but embodiments of the disclosure are not limited thereto. In addition, for example, the wearable device 103 may display another visual object (e.g., a line with start/end arrows) 432 indicating a connection established with the external electronic device 422.

In the embodiment 400 of FIG. 4A, the visual object 431 and the visual object 432 illustrate visual objects indicating the connection, but embodiments of the disclosure are not limited thereto. For example, the visual object 431 and the visual object 432 may include information on the connection. For example, the information on the connection may include information as to whether data is transmitted or received by the connection, the time at which the connection was established, the type of the connection (e.g., BT or Wi-Fi), the communication state of the connection (e.g., signal quality), or the subject of the connection (e.g., information for distinguishing between a pairing device and a connection device in the case of BT).

According to an embodiment, the wearable device 103 may further display a visual object representing a connection state between those external electronic devices. For example, the wearable device 103 may display a visual object 433 (e.g., a dashed line) indicating a connection between the external electronic device 421 and the external electronic device 422. According to an embodiment, the visual object 433 indicating the connection between those external electronic devices may have a different shape from the visual object 431 or the visual object 432 indicating the connection between the wearable device 103 and the external electronic devices. However, embodiments of the disclosure are not limited thereto. For example, the visual object 433 and the visual object 431 (or the visual object 432) may have the same shape. The shape of the visual object representing the connection state may be set by the user 410. Specific details related thereto will be described later with reference to FIG. 11.

Further, the wearable device 103 may further display an indicator 434 (e.g., a dashed line) indicating that it is connectable, based on identifying that the wearable device 103 is capable of establishing a connection with the external electronic device 423. For example, the indicator 434 may represent a visual object for indicating that the connection is possible between the external electronic device 423 and the wearable device 103. According to an embodiment, the indicator 434 may have a different shape from the visual object 431 (or the visual object 432) indicating the connection.

According to an embodiment, the connection and the connection availability may be included in the connection state. However, embodiments of the disclosure are not limited thereto. For example, the connection state may include a state in which the connection has been established but not sending or receiving data, and a state in which there is a record of the connection being established in the past.

Figure 4B:
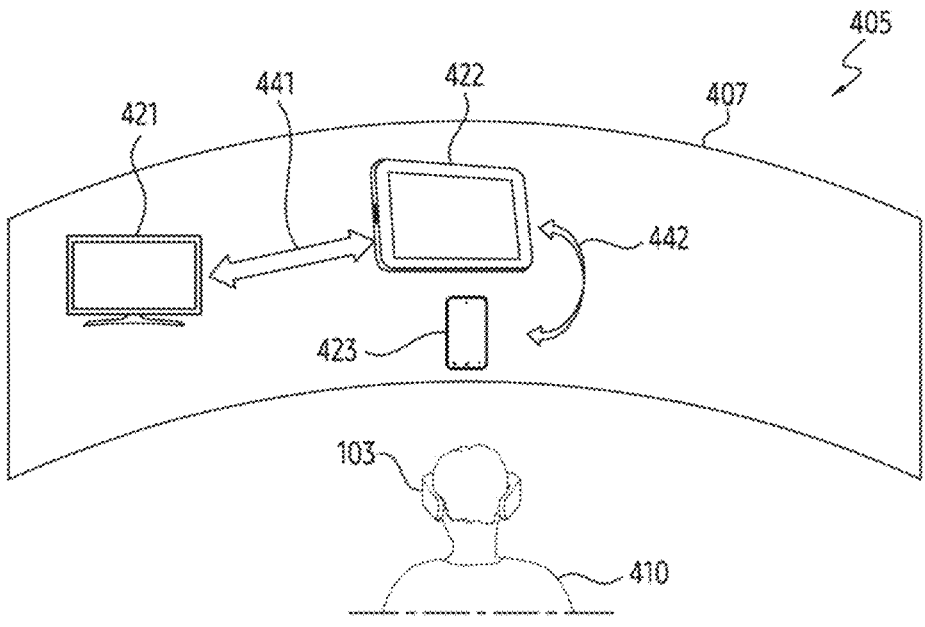
FIG. 4B illustrates an example of a method of displaying a visual object representing a connection state between external electronic devices.

FIG. 4B illustrates an example of a method of displaying a visual object representing a connection state between external electronic devices.

The wearable device 103 of FIG. 4B may illustrate an example of the electronic device 101 of FIG. 1. FIG. 4B illustrates an embodiment 405 of connection between a plurality of external electronic devices 421, 422, 423.

Referring to the embodiment 405, the wearable device 103 may identify a plurality of external electronic devices 421, 422, 423. Specific details thereof are substantially the same as those of FIG. 4A, and thus any redundant description will be omitted.

Referring to the embodiment 405, a connection may be established between a plurality of external electronic devices 421, 422, 423. For example, a connection between the external electronic device 421 and the external electronic device 422 may be established. In addition, for example, a connection between the external electronic device 422 and the external electronic device 423 may be established. In the example of FIG. 4B, a connection between the wearable device 103 and the plurality of external electronic devices 421, 422, 423 may not be established. However, embodiments of the disclosure are not limited thereto. Referring to the embodiment 405 of FIG. 4B, the external electronic device 422 may be connected to both the external electronic device 421 and the external electronic device 423. The external electronic device 422 may be referred to as an external electronic device capable of supporting multi-control. Specific details related thereto will be described below with reference to FIGS. 8A and 8B.

According to an embodiment, the wearable device 103 may display a visual object representing a connection state. For example, the wearable device 103 may display a visual object 441 indicating a connection established between the external electronic device 421 and the external electronic device 422. For example, the wearable device 103 may display, through a display (e.g., the display module 160 of FIG. 1), a visual object 441 indicating a connection established between the external electronic device 421 and the external electronic device 422. In addition, for example, the wearable device 103 may display a visual object 442 indicating a connection established between the external electronic device 422 and the external electronic device 423.

In the embodiment 405 of FIG. 4B, the visual object 441 and the visual object 442 illustrate visual objects indicating the connection, but embodiments of the disclosure are not limited thereto. For example, the visual object 441 and the visual object 442 may include information on the connection. For example, the information about the connection may include information on whether data is being transmitted or received by the connection, the time at which the connection was established, the type of the connection (e.g., BT or Wi-Fi), the communication state of the connection (e.g., signal quality), or the subject of the connection (e.g., information for distinguishing between a pairing device and a connection device in the case of BT).

Referring to FIGS. 4A and 4B, the wearable device 103 may display, through the display, a visual object representing a connection state between external electronic devices or a connection state between the external electronic devices and the wearable device 103. In addition, the wearable device 103 may change the connection state based on identifying an input of the user 410 about the visual object (e.g., visual object 441, visual object 442). For example, the change in the connection state may include switching, releasing (or disconnecting), or establishing of the connection. Accordingly, an electronic device and a method according to embodiments of the disclosure may process the user input to improve usability in an XR environment and provide a user with an immersive user experience.

Figure 5:
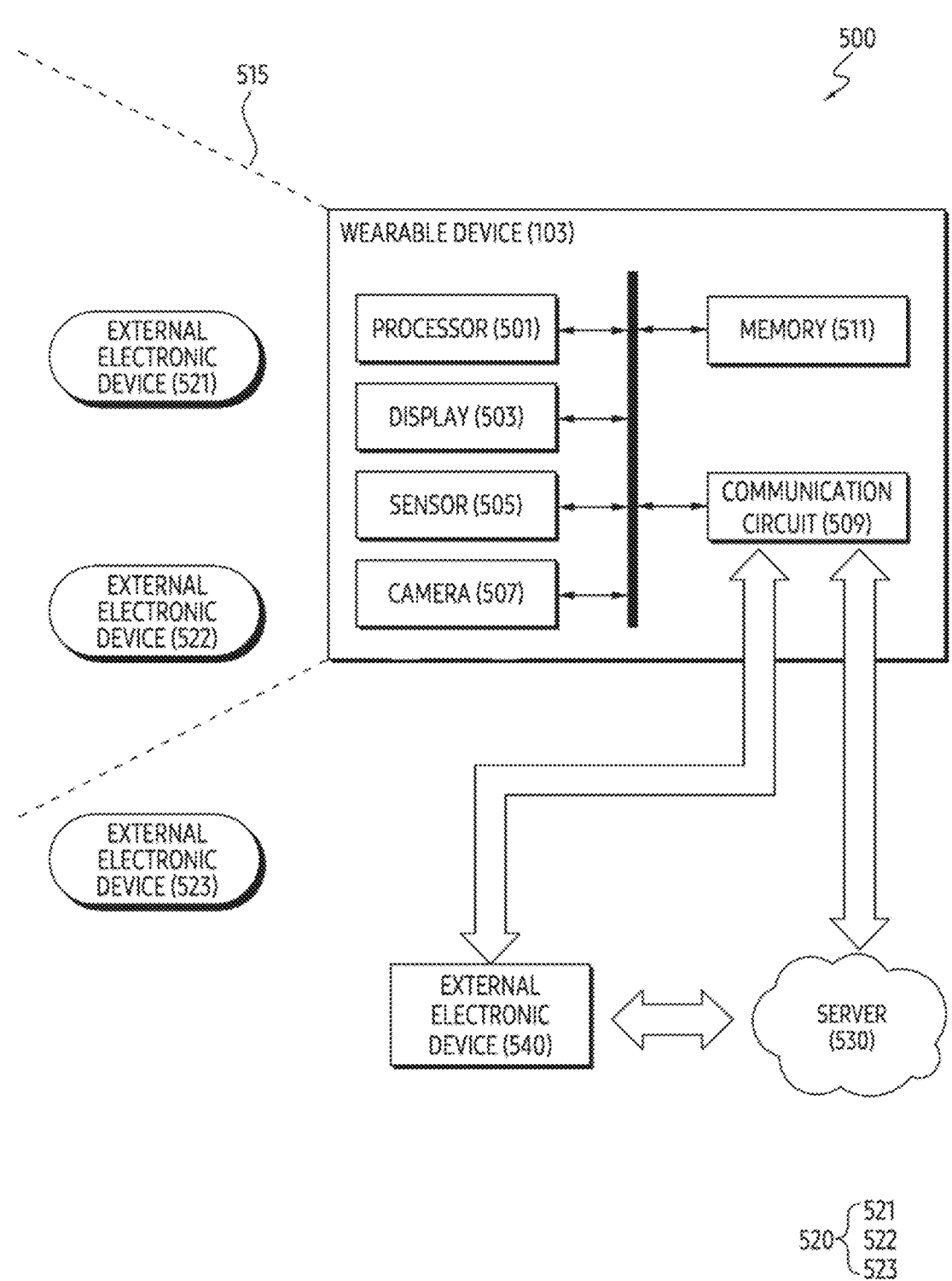
FIG. 5 illustrates an example block diagram of a wearable device in a network environment.

FIG. 5 is an example block diagram of a wearable device in a network environment.

The wearable device 103 of FIG. 5 may illustrate an example of the electronic device 101 of FIG. 1, the wearable device 103 of FIGS. 2A to 3B, or the wearable device 103 of FIGS. 4A and 4B.

Referring to FIG. 5, an exemplary situation is illustrated in which the wearable device 103, a server 530, and an external electronic device 540 are connected to each other based on a wired network and/or a wireless network. For example, the wired network may include a network such as e.g., the Internet, a local area network (LAN), a wide area network (WAN), or a combination thereof. For example, the wireless network may include a network such as e.g., long term evolution (LTE), 5G new radio (NR), wireless fidelity (Wi-Fi), Zigbee, near field communication (NFC), Bluetooth, Bluetooth low-energy (BLE), or a combination thereof. While the wearable device 103, the server 530, and the external electronic device 540 are illustrated as being directly connected, the wearable device 103, the server 530, and the external electronic device 540 may be indirectly connected via one or more routers and/or access points (APs). In other words, the wearable device 103 is illustrated as being directly connected to communication circuitry of the server 530 (or the external electronic device 540) via the communication circuit 509, but embodiments of the disclosure are not limited thereto.

Referring to FIG. 5, the wearable device 103 according to an embodiment may include at least one of a processor 501, a display 503, a sensor 505, a camera 507, a communication circuit 509, or a memory 511. The processor 501, the display 503, the sensor 505, the camera 507, the communication circuit 509, and the memory 511 may be electrically and/or operably coupled with each other via a communication bus. Hereinafter, when the hardware components are operatively coupled with each other, it may mean that a direct connection or an indirect connection between the hardware components is established by wire or wirelessly, such that among the hardware components, a second hardware component may be controlled by a first hardware component. Although the diagram is illustrated based on different blocks, embodiments are not limited thereto, and some of the hardware components illustrated in FIG. 5 (e.g., at least a portion of the processor 501, the communication circuit 509, and the memory 511) may be incorporated in a single integrated circuit such as e.g., a system-on-chip (SoC). The type and/or number of hardware components included in the wearable device 103 are not limited to those illustrated in FIG. 5. For example, the wearable device 103 may include only some of the hardware components illustrated in FIG. 5.

According to an embodiment, the processor 501 of the wearable device 103 may include a hardware component to process data based on one or more instructions. The hardware component for processing data may include, for example, an arithmetic and logic unit (ALU), a floating-point unit (FPU), and a field programmable gate array (FPGA). For example, a hardware component for processing data may include a central processing unit (CPU), a graphics processing unit (GPU), a digital signal processing (DSP), and/or a neural processing unit (NPU). The processors 501 may be or correspond to one or more processors. For example, the processor 501 may have a structure of a multi-core processor such as a dual-core, a quad-core, or a hexa-core. The processor 501 of FIG. 5 may include at least a portion of the processor 120 of FIG. 1. In some embodiments, the processor 501 may correspond to at least one processor like a CPU, a microprocessor unit (MPU), an application processor (AP), a coprocessor (CP), a system-on-chip (SoC), or an integrated circuit (IC).

According to an embodiment, the display 503 of the wearable device 103 may output visualized information (e.g., the visual objects of FIGS. 4A, 4B, 8A, 8B, 9, 10A, 10B, and 11) to the user. The number of the displays 503 included in the wearable device 103 may be one or more. For example, the display 503 may be controlled by the processor 501 and/or a graphic processing unit (GPU) to output the visualized information to the user. The display 503 may include a flat panel display (FPD) and/or an electronic paper. The FPD may include a liquid crystal display (LCD), a plasma display panel (PDP), a digital mirror device (DMD), one or more light emitting diodes (LEDs), and/or a micro LED. The LED may include an organic LED (OLED). The display 503 of FIG. 5 may include at least a portion of the display module 160 of FIG. 1.

In an embodiment, light transmission may occur in at least a portion of the display 503. The wearable device 103 may provide a user with a user experience related to augmented reality by providing a combination of light outputting through the display 503 and light transmitting through the display 503. As described above with reference to FIGS. 2A and 2B and/or FIGS. 3A and 3B, the display 503 of the wearable device 103 according to an embodiment may have a structure for covering the entire FoV of the user or emitting light toward the FoV of the user, in a state of being worn on a body part of the user, such as a head. The wearable device 103 may include other output means for outputting information in a form other than a visual form and an auditory form. For example, the wearable device 103 may include at least one speaker for outputting an audio signal and/or a motor (or actuator) for providing haptic feedback based on vibrations. In the above example, the display 503 for providing the user experience related to the augmented reality is illustrated, but embodiments of the disclosure are not limited thereto. For example, the wearable device 103 may perform rendering an image for providing a user experience related to virtual reality, and may display the rendered image through the display 503.

According to an embodiment, the wearable device 103 may include a sensor 505 and a camera 507. For example, the wearable device 103 may include the sensor 505 for identifying a specified event, another specified event, and a user input. For example, the sensor 505 may include an IMU (or IMU sensor), a biometric sensor, an acoustic sensor (or microphone), a gyro sensor, a gravity sensor, and/or an acceleration sensor. For example, the wearable device 103 may include a camera 507 (or image sensor) for recognizing an actual environment. The sensor 505 of FIG. 5 may include at least a portion of the sensor module 176 of FIG. 1. The camera 507 of FIG. 5 may include at least a portion of the camera module 180 of FIG. 1. For example, the wearable device 103 may identify positions of the external electronic devices (521, 522, 523) using the sensor 505 and/or the camera 507.

According to an embodiment, the communication circuit 509 of the wearable device 103 may include hardware components for supporting transmission and/or reception of an electrical signal between the external electronic devices 520 to be identified and the wearable device 103. In addition, the communication circuit 509 of the wearable device 103 may include hardware components for supporting transmission and/or reception of an electrical signal between the server 530 providing an event and the external electronic device 540. The communication circuit 509 may include, for example, at least one of a modem (MODEM), an antenna, or optic/electronic (O/E) converter. The communication circuit 509 may support transmission and/or reception of an electrical signal, based on various types of communication means such as Ethernet, Bluetooth (BT), Bluetooth low energy (BLE), ZigBee, long term evolution (LTE), 5G new radio (NR), and wireless-fidelity (Wi-Fi). The communication circuit 509 of FIG. 5 may include at least a portion of the communication module 190 and/or the antenna module 197 of FIG. 1.

According to an embodiment, the memory 511 of the wearable device 103 may include a hardware component for storing data and/or instructions input to or output from the processor 501. The memory 511 may include, for example, a volatile memory such as a random-access memory (RAM) and/or a non-volatile memory such as a read-only memory (ROM). The volatile memory may include, for example, at least one of a dynamic RAM (DRAM), a static RAM (SRAM), a cache RAM, and a pseudo SRAM (PSRAM). The non-volatile memory may include, for example, at least one of a programmable ROM (PROM), an erasable PROM (EPROM), an electrically erasable PROM (EEPROM), a flash memory, a hard disk, a compact disk, or an embedded multimedia card (eMMC). The memory 511 of FIG. 5 may include at least a portion of the memory 130 of FIG. 1.

Further, the wearable device 103 according to an embodiment may include an output means for outputting information in a form other than a visualized form. For example, the wearable device 103 may include a speaker for outputting an acoustic signal. For example, the wearable device 103 may include a motor for providing haptic feedback based on vibrations.

Referring to FIG. 5, according to an embodiment, one or more instructions (or commands) indicating an arithmetic operation and/or an action to be performed on data by the processor 501 of the wearable device 103 may be stored in the memory 511 of the wearable device 103. The set of one or more instructions may be referred to as a program, firmware, operating system, process, routine, sub-routine, and/or application. Hereinafter, an application being installed in an electronic device (e.g., the wearable device 103) may mean that one or more instructions provided in the form of an application are stored in the memory 511, and thus the one or more applications are stored in an executable format (e.g., a file having an extension designated by an operating system of the wearable device 103) by a processor of the electronic device. According to an embodiment, the wearable device 103 may execute one or more instructions stored in the memory 511 to perform the operations of FIGS. 6A, 6B, 12, and 13.

According to an embodiment, the wearable device 103 may identify the external electronic devices 520. For example, the wearable device 103 may identify the external electronic devices 520 based on the communication circuit 509. For example, the external electronic devices 520 may include at least one of an electronic device connectable through short-range wireless communication based on the communication circuit 509, an electronic device having the same account information as that of the wearable device 103 identified based on (or identified by using) the communication circuit 509, an electronic device located within a specified distance from the wearable device 103 identified based on the communication circuit 509, or an electronic device connected to the same access point (AP) as the wearable device 103 identified based on the communication circuit 509.

According to an embodiment, at least some of the external electronic devices 520 may be associated with a visual object representing a connection state through the display 503 of the wearable device 103. For example, at least some of the external electronic devices 520 may indicate an object (or an object for identification) on which the visual object is to be displayed.

According to an embodiment, the wearable device 103 may identify an external electronic device located within the FoV 515 of the wearable device 103 among the external electronic devices 520. For example, the wearable device 103 may identify the external electronic device 521 and the external electronic device 522. For example, the wearable device 103 may provide the external electronic device 521 and the external electronic device 522 within the FoV 515 through the display 503. For example, the wearable device 103 providing virtual reality may display, through the display 503, a rendered image indicating the external electronic device 521 and a rendered image indicating the external electronic device 522. Alternatively, for example, the wearable device 103 providing augmented reality may provide the external electronic device 521 and the external electronic device 522 transmitted through the display 503. The direction in which the FoV 515 faces may change according to a gaze direction of the user wearing the wearable device 103. The FoV 515 may be referred to as a gaze direction of the user of the wearable device 103, a recognition direction, a recognition range, or an identification range of the wearable device 103. The wearable device 103 identifying external electronic devices based on the communication circuit 509 and identifying some external electronic devices within the FoV 515 among the identified external electronic devices will be described in more detail with reference to FIG. 7 below.

According to an embodiment, the wearable device 103 may identify connection states of the external electronic devices 520. For example, the wearable device 103 may transmit a first signal to each of the external electronic devices 520. For example, the wearable device 103 may broadcast or multicast the first signal to each of the external electronic devices 520. According to an embodiment, the wearable device 103 may receive a second signal from at least some of the external electronic devices 520, in response to the first signal. For example, each of the first signal and the second signal may be referred to as an advertising signal, an identification signal, a broadcasting signal, and a multicasting signal. According to an embodiment, the wearable device 103 may establish a connection with the at least some of the external electronic devices based on the second signal, or may identify the connection state of the at least some of the external electronic devices. For example, the wearable device 103 may transmit the first signal based on at least one of every specified intervals or a user input.

According to an embodiment, the first signal may include at least one of identification information of the wearable device 103, account information of the user of the wearable device 103, connection state information of the wearable device 103, connection record information of the wearable device 103, transmission strength information of the first signal, detection area information based on the first signal, battery information of the wearable device 103, or voice output information of the wearable device 103. Further, according to an embodiment, the second signal may include at least one of identification information of an external electronic device, account information of a user of the external electronic device, connection state information of the external electronic device, connection record information of the external electronic device, transmission strength information of the second signal, detection area information based on the second signal, battery information of the external electronic device, or sound output information of the external electronic device. The external electronic device may be included in the at least some of the external electronic devices 520.

For example, the identification information may include an identity of the wearable device 103 (or the external electronic device). The identity may include address information or port information for connection. For example, the account information may include account information of the user registered in the wearable device 103. For example, the connection state information may include information on an electronic device to which the wearable device 103 (or the external electronic device) is currently connected (or paired). The connection state information may be referred to as pairing information or pairing state information. For example, the connection record information may include information on an electronic device having a history of connection by the wearable device 103 (or the external electronic device). The connection record information may be referred to as a pairing list, a connection history list, a connectable list, or a connection list. For example, the transmission strength information may include transmission intensity of a signal (e.g., the first signal or the second signal) transmitted by the wearable device 103 (or the external electronic device). For example, the detected area information may include information on an area identifiable based on the signal. For example, the battery information may include a current battery level of the wearable device 103 (or the external electronic device). For example, the sound output information may include information about a role of an output device (e.g., a left output device or a right output device) that the wearable device 103 (or the external electronic device) includes.

According to an embodiment, the wearable device 103 may identify an event associated with a connection with respect to an external electronic device which establishes a connection with the wearable device 103 or to which the wearable device 103 recognizes the connection state. For example, the event associated with the connection may include at least one of an input to a visual object for establishing a connection displayed through the display 503, receiving information for identifying whether a connection is possible to an external electronic device (e.g., the external electronic devices 520) or the wearable device 103, from an external electronic device (e.g., the server 530 or the external electronic device 540) connected to the wearable device 103, executing a function for performing a plurality of connections, an input for changing the connection.

According to an embodiment, the wearable device 103 may be connected to an external electronic device that provides an event associated with the connection. For example, the wearable device 103 may be connected to the server 530 and the external electronic device 540. For example, the wearable device 103 may directly receive the event from the server 530. Alternatively, for example, the wearable device 103 may directly receive the event from the external electronic device 540. Alternatively, for example, the wearable device 103 may receive the event identified from the external electronic device 540 via the server 530. Alternatively, for example, the wearable device 103 may receive the event identified from the server 530 via the external electronic device 540. In this case, the server 530 and the external electronic device 540 may be connected to each other. For example, the server 530 and the external electronic device 540 that provide the event associated with the connection may be referred to as a source device.

For example, the server 530 may be an electronic device that is connected to the external electronic devices 520 and manages the external electronic devices 520. For example, the external electronic devices 520 may provide the server 530 with information on a change in the connection state (e.g., switching, establishing (or re-establishing), or releasing of the connection) of each of the external electronic devices 520. The server 530 may provide the information to the wearable device 103. For example, the external electronic device 540 may include an electronic device in which the same account information as the wearable device 103 is registered. For example, the account information may include the account information of the user of the wearable device 103.

Referring to the foregoing description, it is described that the wearable device 103 obtains the event from the server 530 or the external electronic device 540, but embodiments of the disclosure are not limited thereto. For example, the wearable device 103 may directly obtain the event from an external electronic device connected to the wearable device 103 among the external electronic devices 520. Alternatively, for example, the wearable device 103 may directly identify the event for the connected external electronic device.

According to an embodiment, the wearable device 103 may display a visual object indicating the connection through the display 503, based on identifying the event associated with the connection. For example, the visual object may include visual information (or an image) for displaying the connection. Specific details related thereto will be described later with reference to FIG. 11.

Referring to the foregoing description, examples of connection states and visual displaying for the connection states according to embodiments of the disclosure are as follows.

For example, the wearable device 103 may be connected to the external electronic device 521. The wearable device 103 may display a visual object indicating a connection between the wearable device 103 and the external electronic device 521 and information about the connection. For example, the information about the connection may include whether data is being transmitted or received by the connection, the time at which the connection was established, the type of the connection (e.g., BT or Wi-Fi), a communication state (e.g., signal quality) of the connection, or the subject of the connection (e.g., information for distinguishing between a pairing device and a connection device in the case of BT).

For example, a connection between the external electronic device 521 and the external electronic device 522 may be established. The wearable device 103 may display a visual object indicating a connection between the external electronic device 521 and the external electronic device 522 and information about the connection.

For example, a connection between the external electronic device 521 and the external electronic device 523 may be established. The wearable device 103 may display a visual object indicating the connection between the external electronic device 521 and the external electronic device 523 and information about the connection. Alternatively, for example, a connection between the external electronic device 523 and the wearable device 103 may be established. The wearable device 103 may display a visual object indicating the connection between the wearable device 103 and the external electronic device 523 and information about the connection.

In the above-described examples, the wearable device 103 may receive information about the connection from the external electronic devices (521, 522, 523), or may receive the information about the connection information via the external electronic device 540 or the server 530.

Figure 6A:
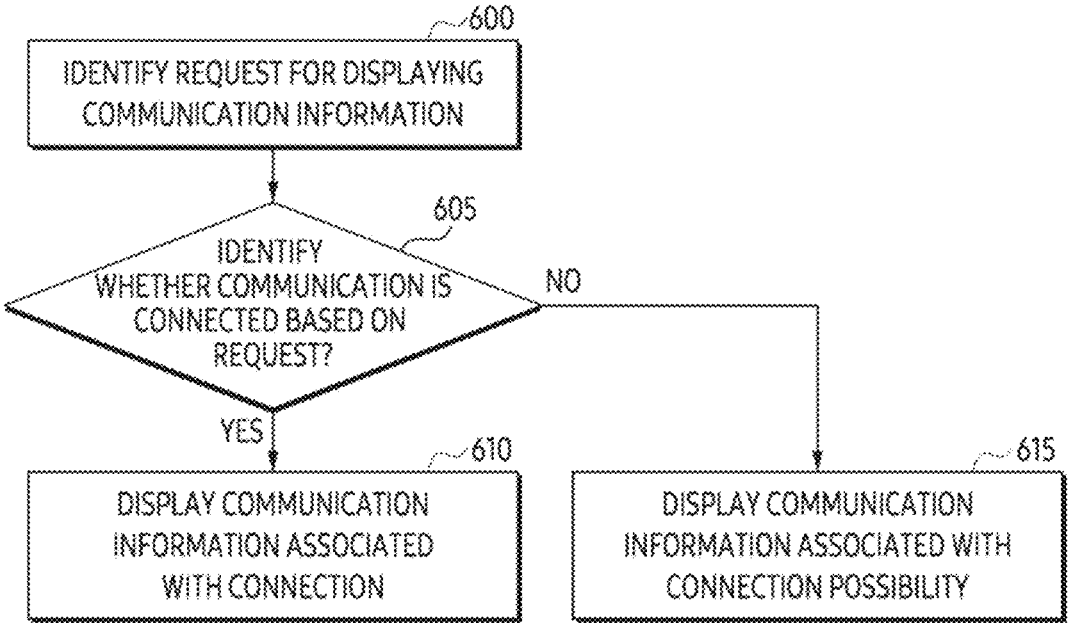

FIGS. 6A and 6B illustrate an example of a method for displaying a visual object representing a connection state of an external electronic device.

In FIG. 6A, at least a portion of the method may be performed by the wearable device 103 of FIG. 5. For example, at least a portion of the method may be controlled by the processor 501 of the wearable device 103. In the following embodiments, each operation may be performed sequentially, but is not necessarily performed sequentially. For example, the execution sequence of each operation may be changed, and at least two operations thereof may be performed in parallel.

In operation 600, the wearable device 103 may identify a request for displaying communication information. For example, the request for displaying the communication information may include at least one of an input to a visual object for establishing a connection displayed through the display 503, receiving information for identifying whether a connection is possible to an external electronic device (e.g., the external electronic devices 520 of FIG. 5) or the wearable device 103, from an external electronic device (e.g., the server 530 or the external electronic device 540 of FIG. 5) connected to the wearable device 103, executing a function for performing a plurality of connections, an input for changing the connection.

For example, receiving the information identifying whether the connection is possible may indicate that an external electronic device (e.g., the server 530 or the external electronic device 540 of FIG. 5) having identified whether any external electronic device is connectable to the external electronic device (e.g., the external electronic devices 520 of FIG. 5) or the wearable device 103 provides the information. For example, receiving the information may include obtaining the information from the external electronic device identified by performing scanning by the wearable device 103.

For example, a function for performing the plurality of connections may include multi-control. However, embodiments of the disclosure are not limited thereto. For example, the function for performing the plurality of connections may be understood as including a specified function or service associated with the connection. For example, the plurality of connections may include connections of a plurality of electronic devices supporting Bluetooth (BT) in the case of using the BT. For example, the plurality of connections may include a connection between a plurality of audio output devices and a device providing audio information. For example, the function for performing the plurality of connections may include executing a quick share.

For example, the change in the connection state may include switching of the connection, releasing of the connection, or establishing (or re-establishing) of the connection. The change in the connection state may be directly identified by the wearable device 103, may be identified based on information obtained from an external electronic device connected to the wearable device 103, or may be identified based on information that a server connected to the wearable device 103 obtained from an external electronic device connected to the server.

In operation 605, the wearable device 103 may identify whether a communication is connected based on the request. For example, the wearable device 103 may identify one or more external electronic devices. For example, the wearable device 103 may identify the one or more external electronic devices using short-range communication based on the communication circuit 509. For example, the short-range communication may include Bluetooth (BT), Bluetooth low energy (BLE), wireless fidelity (Wi-Fi), or ultra-wideband (UWB). However, embodiments of the disclosure are not limited thereto. For example, the wearable device 103 may identify the one or more external electronic devices based on wireless communication or wired communication technology different from the short-range communication. The operation of identifying of the plurality of external electronic devices may be referred to as searching, discovering, detecting, or scanning the one or more external electronic devices. According to an embodiment, the wearable device 103 may identify one or more external electronic devices within FOV of the wearable device 103, among the one or more external electronic devices. The direction to which the FoV is directed may change according to a gaze direction of the user wearing the wearable device 103.

According to an embodiment, the wearable device 103 may identify whether a connection with the one or more external electronic devices has been established, in response to the request.

In operation 610, when the connection has been established, the wearable device 103 may display communication information associated with the connection. For example, the communication information may include a visual object indicating the connection. For example, the visual object may include a line representing a connection between the wearable device 103 and at least some of the one or more external electronic devices for which the connection has been established. Further, for example, the communication information may include whether data is being transmitted or received by the connection, the time at which the connection was established, the type of the connection (e.g., BT or Wi-Fi), the communication state of the connection (e.g., signal quality), or the subject of the connection (e.g., information for distinguishing a pairing device and a connection device in the case of BT).

In operation 615, when the connection is not established, the wearable device 103 may display communication information associated with a connection possibility. For example, the communication information associated with the connection possibility may include an indicator indicating the connection possibility, visual information indicating a connection progress state, or visual information indicating a connection failure.

For example, when the connection with the one or more external electronic devices is not established, the wearable device 103 may display an indicator indicating that a connection is possible to a connectable external electronic device among the one or more external electronic devices. For example, the indicator may be included in the visual information.

Further, for example, the wearable device 103 may display visual information indicating a connection progress state or visual information indicating a connection failure, based on identifying the request associated with the connection. For example, in a case where the wearable device 103 attempts to connect to an external electronic device, but a connection is not available because the external electronic device is already connected to another external electronic device, the wearable device 103 may display visual information indicating information on connection between the external electronic device and the other external electronic device. Alternatively, the wearable device 103 may display visual information indicative of a connection progress state between the wearable device 103 and the external electronic device, and then display visual information indicative of a failure.

In FIG. 6B, at least part of the method may be performed by the wearable device 103 of FIG. 5. For example, at least part of the method may be controlled by the processor 501 of the wearable device 103. In the following embodiments, each operation may be performed sequentially, but is not necessarily performed sequentially. For example, the execution sequence of each operation may be changed, and at least two operations thereof may be performed in parallel.

In operation 650, the wearable device 103 may identify one or more external electronic devices. For example, the wearable device 103 may identify the one or more external electronic devices, based on the communication circuit 509. For example, the wearable device 103 may identify the one or more external electronic devices using short-range communication based on the communication circuit 509. For example, the short-range communication may include Bluetooth (BT), Bluetooth low energy (BLE), wireless fidelity (Wi-Fi), or ultra-wideband (UWB). However, embodiments of the disclosure are not limited thereto. For example, the wearable device 103 may identify the one or more external electronic devices based on wireless communication or wired communication technology different from the short-range communication. The operation of identifying of the plurality of external electronic devices may be referred to as searching, discovering, detecting, or scanning the one or more external electronic devices.

According to an embodiment, the one or more external electronic devices may include at least one of an electronic device connectable through the short-range wireless communication based on the communication circuit 509, an electronic device having the same account information as the account information of the wearable device 103 identified based on the communication circuit 509, an electronic device located within a specified distance from the wearable device 103 identified based on the communication circuit 509, or an electronic device connected to the same access point (AP) as the wearable device 103 identified based on the communication circuit 509.

For example, the one or more external electronic devices may include an electronic device connected to the same node (e.g., an access point (AP)) as the wearable device 103. For example, a plurality of APs may be disposed in a specific area to provide a location-based service. The arrangement of the plurality of APs may be configured according to a range of its service area or a coverage of the AP. Further, a server (e.g., a Wi-Fi positioning system (WPS)) that manages APs may manage information of the plurality of APs and location information of the plurality of APs. For example, the wearable device 103 may identify the one or more external electronic devices connected to the same AP as the wearable device 103, based on the information of the plurality of APs obtained from the server and the location information of the plurality of APs.

For example, the one or more external electronic devices may be identified based on strength of a signal received by the wearable device 103. For example, the wearable device 103 may estimate a distance based on the strength and pattern of the received signal, for indoor positioning. For example, the strength of the signal may include a received signal strength indicator (RSSI). For example, the RSSI may be an indicator indicative of strength of a signal (in units of dBm) in which the strength of the signal decreases over the distance. The RSSI may be defined as the following Equation.

$$RSSI = -(10n\log_{10}(d) - A) \qquad \text{[Equation 1]}$$

wherein "n" represents an attenuation coefficient, "A" represents an RSSI value measured at a certain location (e.g., 1 meter) as a reference value, and "d" represents a distance from a location at which a signal is transmitted. For example, the attenuation coefficient may change depending upon an environment in which the signal is transmitted and received. For example, the wearable device 103 may estimate a distance value based on the RSSI. The wearable device 103 may identify the one or more external electronic devices of which estimated distance value is within a specified distance.

For example, the one or more external electronic devices may be identified based on a positioning technique (e.g., Wi-Fi-based positioning, BLE-based positioning, or Internet of things (IoT) server-based positioning). For example, the wearable device 103 may identify distance information and direction information for an external electronic device through reception and transmission of a high frequency signal, as defined in the section 802.11.ad of the Wi-Fi communication standard. Based on the distance information and the direction information, the AP connected to the external electronic device may identify a correct location of the electronic device. For example, the wearable device 103 may identify the one or more external electronic devices based on the distance information and the direction information obtained from the AP. Further, for example, the wearable device 103 may identify the one or more external electronic devices based on an angle of arrival (AoA) and an angle of departure (AoD) identified using BLE. For example, the wearable device may identify the one or more external electronic devices based on the AoA and the AoD. Furthermore, for example, the wearable device 103 may identify the one or more external electronic devices based on information obtained from a server managing IoT devices (e.g., the server 530 of FIG. 5). For example, the server may specify beforehand or identify the locations of the one or more external electronic devices, which are IoT devices connected to the server. For example, the wearable device 103 may identify the one or more external electronic devices, based on the server.

Further, for example, the one or more external electronic devices may cause the wearable device 103 to identify the one or more external electronic devices by providing a signal including information identifying the wearable device 103 by the one or more external electronic devices, to a server (e.g., an IoT server). For example, the one or more external electronic devices may identify surrounding objects based on a camera or a sensor. For example, in identifying the objects, a UWB sensor may be utilized. In this case, the objects may include the wearable device 103 identified based on the camera or the sensor. The external object may provide information on the identified wearable device 103 to the server. For example, the one or more external electronic devices may display a user interface on a display. For example, the user interface may be a user interface for the user to confirm whether the device (e.g., the wearable device 103) to be identified through the server (or a peer-to-peer (P2P)) is correct. The one or more external electronic devices may provide information to the server, based on the user input (or gesture) to the user interface. The server may perform connection (or mapping) between the wearable device 103 and the one or more external electronic devices, based on the information. In such a circumstance, the connection may be accompanied by authentication (e.g., with a predetermined pattern) to improve its security. Accordingly, the wearable device 103 may identify the one or more external electronic devices. In the above example, an occasion is illustrated in which the object is the wearable device 103, but embodiments of the disclosure are not limited thereto. For example, by identifying a specified gesture or a user of the wearable device 103, the one or more external electronic devices may identify that the wearable device 103 exists, and thus may provide the information about the wearable device 103 to the server. The wearable device 103 may identify the one or more external electronic devices based on the information provided from the server. According to an embodiment, the wearable device 103 may use at least one of the aforementioned methods to identify the location of the one or more external electronic devices. Further, embodiments of the disclosure are not limited thereto, and another method of identifying the location of the external object may be utilized.

According to an embodiment, the wearable device 103 may identify one or more external electronic devices within the FoV of the wearable device 103 among the one or more external electronic devices. The direction to which the FoV is directed may change depending upon the gaze direction of the user wearing the wearable device 103.

According to an embodiment, the wearable device 103 may identify devices having the same account information as the wearable device 103 among the one or more external electronic devices in the FoV. In this case, when the shapes of the devices having the same account information are similar to each other, the wearable device 103 may distinguish the devices through additional signaling. For example, the wearable device 103 may transmit a scanning signal for the devices. In the devices, distinction between the devices may be performed through a screen (or UI) displayed based on the scanning signal. Alternatively, for example, a device not directly connected to the wearable device 103 of the devices may be distinguished with indirect signaling via another external electronic device (e.g., a server).

Referring to the foregoing, the wearable device 103 may identify the plurality of connectable external electronic devices and may perform distinction between the plurality of external electronic devices using FoV, account information, and additional signaling.

In operation 655, the wearable device 103 may identify a first connection. For example, the first connection may include a connection between the one or more external electronic devices or a connection between some of the one or more external electronic devices and the wearable device 103.

According to an embodiment, the wearable device 103 may identify connection states of the one or more external electronic devices. For example, the wearable device 103 may transmit a first signal to each of the one or more external electronic devices. For example, the wearable device 103 may broadcast or multicast the first signal to each of the one or more external electronic devices. According to an embodiment, the wearable device 103 may receive a second signal from at least some of the one or more external electronic devices, in response to the first signal. For example, each of the first signal and the second signal may be referred to as an advertising signal, an identification signal, a broadcasting signal, and a multicasting signal. According to an embodiment, the wearable device 103 may establish a connection with the at least some of the external electronic devices based on the second signal, or may identify the connection states of the at least some of the external electronic devices. For example, the wearable device 103 may transmit the first signal based on at least one of every specified period or a user input.

According to an embodiment, the first signal may include at least one of identification information of the wearable device 103, account information of the user of the wearable device 103, connection state information of the wearable device 103, connection record information of the wearable device 103, transmission strength information of the first signal, detection area information based on the first signal, battery information of the wearable device 103, or sound output information of the wearable device 103. Further, according to an embodiment, the second signal may include at least one of identification information of an external electronic device, account information of a user of an external electronic device, connection state information of an external electronic device, connection record information of an external electronic device, transmission strength information of the second signal, detection area information based on the second signal, battery information of an external electronic device, or sound output information of an external electronic device. The external electronic device may be included in the at least some of the one or more external electronic devices.

For example, the identification information may include an identity of the wearable device 103 (or the external electronic device). The identifier may include address information or port information for connection. For example, the account information may include account information of the user registered in the wearable device 103. For example, the connection state information may include information on an electronic device to which the wearable device 103 (or the external electronic device) is currently connected (or paired). The connection state information may be referred to as pairing information or pairing state information. For example, the connection record information may include information on an electronic device having a history of connection by the wearable device 103 (or the external electronic device). The connection record information may be referred to as a pairing list, a connection history list, a connectable list, or a connection list. For example, the transmission intensity information may include a transmission intensity of a signal (e.g., the first signal or the second signal) transmitted by the wearable device 103 (or the external electronic device). For example, the detected area information may include information on an area identifiable based on the signal. For example, the battery information may include a current battery level of the wearable device 103 (or the external electronic device). For example, the sound output information may include information about a role (e.g., a left output device or a right output device) of an output device included in the wearable device 103 (or the external electronic device).

In operation 660, the wearable device 103 may display a first visual object based on identifying an event associated with the first connection. For example, the wearable device 103 may obtain the event from another external electronic device. For example, the other external electronic device may include the server 530 or the external electronic device 540 of FIG. 5. Alternatively, for example, the wearable device 103 may obtain the event from an external electronic device establishing the first connection with the wearable device 103, or the wearable device 103 may identify the event for the first connection. For example, the wearable device 103 may generate (or render) the first visual object, based on identifying the event associated with the first connection, and may display the generated first visual object.

For example, the event associated with the first connection may include at least one of an input about a visual object for establishing a connection displayed through the display 503, receiving information for identifying whether a connection is possible to an external electronic device (e.g., the external electronic devices 520 of FIG. 5) or the wearable device 103, from an external electronic device (e.g., the server 530 or the external electronic device 540 of FIG. 5) connected to the wearable device 103, executing a function for performing a plurality of connections, an input for changing the connection.

For example, the visual object for establishing the connection may include an icon indicating a function (or a menu) for identifying a communication state with an electronic device or establishing a connection through a communication technique. For example, the function (or menu)

may include a connection according to a communication technique such as Bluetooth, Wi-Fi, or cellular. For example, the icon may be included in a setting of the electronic device. The electronic device may include a wearable device 103. For example, the visual object may be used for the wearable device 103 to check for a nearby connectable device, or to check for currently connected information.

For example, receiving the information for identifying whether the connection is possible may indicate that an external electronic device (e.g., the server 530 or the external electronic device 540 of FIG. 5) identifying whether any external electronic device is connectable to the external electronic device (e.g., the external electronic devices 520 of FIG. 5) or the wearable device 103 provides the information. For example, receiving the information may include obtaining the information from the external electronic device identified by performing scanning by the wearable device 103.

For example, the function for performing the plurality of connections may include multi-control. However, embodiments of the disclosure are not limited thereto. For example, the function for performing the plurality of connections may be understood as including a specified function or service associated with the connection. For example, the plurality of connections may include connections of a plurality of electronic devices supporting BT in the case of using the BT. For example, the plurality of connections may include a connection between a plurality of audio output devices and a device providing audio information. For example, the function for performing the plurality of connections may include executing a quick share.

For example, the operation of changing in the connection state may include switching the first connection to another connection (e.g., a second connection as described below), releasing the first connection, or establishing (or re-establishing) the first connection.

According to an embodiment, the wearable device 103 may display the first visual object based on identifying (or receiving) the event. For example, the first visual object may include a visual object for displaying the first connection. For example, the wearable device 103 may display the first visual object for a specified time duration from the timing at which the event is identified. Alternatively, for example, when a movement of the user of the wearable device 103 is within a specified range, the wearable device 103 may display the first visual object. The movement may include a movement of a body part (e.g., a hand) of the user or a movement of the user. For example, the specified time duration and the specified range may be set by the user.

According to an embodiment, the first visual object may be displayed with respect to the electronic devices (e.g., the first electronic device and the second electronic device) that established the first connection. The electronic devices may be included in the plurality of external electronic devices identified by the wearable device 103. For example, the first visual object may include a first icon representing connection to a first electronic device, a second icon representing connection to a second electronic device, and a line representing connection between the first icon and the second icon. In an example, when the first connection is established between the wearable device 103 and an external electronic device, the first electronic device or the second electronic device may include the wearable device 103. For example, when the electronic devices establishing the first connection are located within the FoV of the wearable device 103, the first visual object may extend from the first electronic device to the second electronic device. Alternatively, when the first electronic device among the electronic devices establishing the first connection is located outside the FoV of the wearable device 103, the first visual object may extend from an area corresponding to the location of the first electronic device in the FoV to the second electronic device.

According to an embodiment, the wearable device 103 may further display an indicator indicating a connection possibility together with the first visual object, based on identifying the event associated with the first connection. For example, the wearable device 103 may identify a connection possibility between external electronic devices or a connection possibility between the external electronic device and the wearable device 103, based on the first signal and the second signal. Alternatively, for example, the wearable device 103 may transmit a capability information inquiry message to the external electronic device and may receive the capability information message in response thereto. The wearable device 103 may identify a connection possibility between the external electronic devices or a connection possibility between the external electronic device and the wearable device 103, based on the capability information inquiry message and the capability information message. The wearable device 103 may display the indicator indicating that the external electronic device associated with the first connection is connectable with another external electronic device, based on the identified connection possibility. The other external electronic device may indicate an electronic device not associated with the first connection.

According to an embodiment, the wearable device 103 may display visual information indicating a connection progress state or visual information indicating a connection failure, based on identifying the event associated with the first connection. For example, in a case where the wearable device 103 attempts to connect to an external electronic device, but a connection is not available because the external electronic device is already connected to another external electronic device, the wearable device 103 may display visual information indicating information about connection between the external electronic device and the other external electronic device. Alternatively, the wearable device 103 may display visual information indicative of a connection progress state between the wearable device 103 and the external electronic device, and then, display visual information indicative of a connection failure.

In operation 665, the wearable device 103 may obtain an input to the first visual object. For example, the wearable device 103 may identify the user's input to the first visual object. For example, the user input may include a drag (or drag-and-drop) input.

According to an embodiment, the user input may cause a change in the first connection. For example, the change in the first connection may include a switching from the first connection to another connection (e.g., a second connection as described below), releasing the first connection, or re-establishing the first connection. Hereinafter, the switching from the first connection to the other connection will be described as an example, but embodiments of the disclosure are not limited thereto. For example, the case where the first connection is released will be described in further detail with reference to FIG. 10B below.

In operation 670, the wearable device 103 may transmit a request signal for establishing a second connection. For example, the wearable device 103 may identify the second connection changed from the first connection, based on identifying acquisition of the input. When the electronic devices establishing the first connection are a first electronic device and a second electronic device, the second connection may include a connection between the first electronic device and a third electronic device. In this case, the third electronic device may be identified based on the input. For example, the wearable device 103 may transmit the request signal to the first electronic device, the second electronic device, and the third electronic device, respectively. In this context, the request signal transmitted to the first electronic device may be used to request releasing (or disconnect) the first connection and establishing the second connection. The request signal transmitted to the second electronic device may be used to request to release the first connection. The request signal transmitted to the third electronic device may be used to request establishing the second connection. In an example, one of the first electronic device, the second electronic device, and the third electronic device may be the wearable device 103. In this case, the request signal may be transmitted only to the wearable device 103 and other electronic devices among the first electronic device, the second electronic device, and the third electronic device.

According to an embodiment, when the user input is a drag input, the second connection for executing a specified function may be established based on a direction of the drag input. For example, when the direction of the drag input is a first direction from the first electronic device to the third electronic device, the second connection for executing a first function may be established. Alternatively, when the direction of the drag input is a second direction from the third electronic device to the first electronic device, the second connection for executing a second function different from the first function may be established. In this case, the wearable device 103 may transmit the request signal for establishing the second connection for executing the first function or the second function. Specific details related thereto will be described with reference to FIG. 9 below.

In operation 675, the wearable device 103 may receive a response signal. For example, the wearable device 103 may receive the response signal to the request signal. In the above example, the response signal may indicate that the second connection is established. For example, the response signal may be received from the first electronic device or the third electronic device. Alternatively, for example, the response signal may be received from a server connected to the wearable device 103 and connected to the first electronic device or the third electronic device. Based on receiving the response signal, the wearable device 103 may identify that the second connection is established.

In operation 680, the wearable device 103 may display a second visual object indicating the second connection. For example, based on receiving the response signal, the wearable device 103 may cease displaying the first visual object and display the second visual object. For example, the wearable device 103 may first cease displaying the first visual object and then display the second visual object, or may first display the second visual object and then cease displaying the first visual object. For example, the description of the second visual object may be applied substantially in the same manner as the description of the first visual object.

According to an embodiment, the wearable device 103 may display information about the connection together with the first visual object and the second visual object indicating the connection. For example, the information about the connection may include whether data is being transmitted or received by the connection, the time at which the connection was established, the type of the connection (e.g., BT or Wi-Fi), a communication state (e.g., signal quality) of the connection, or the subject of the connection (e.g., information for distinguishing between a pairing device and a connection device in the case of BT).

Figure 7:
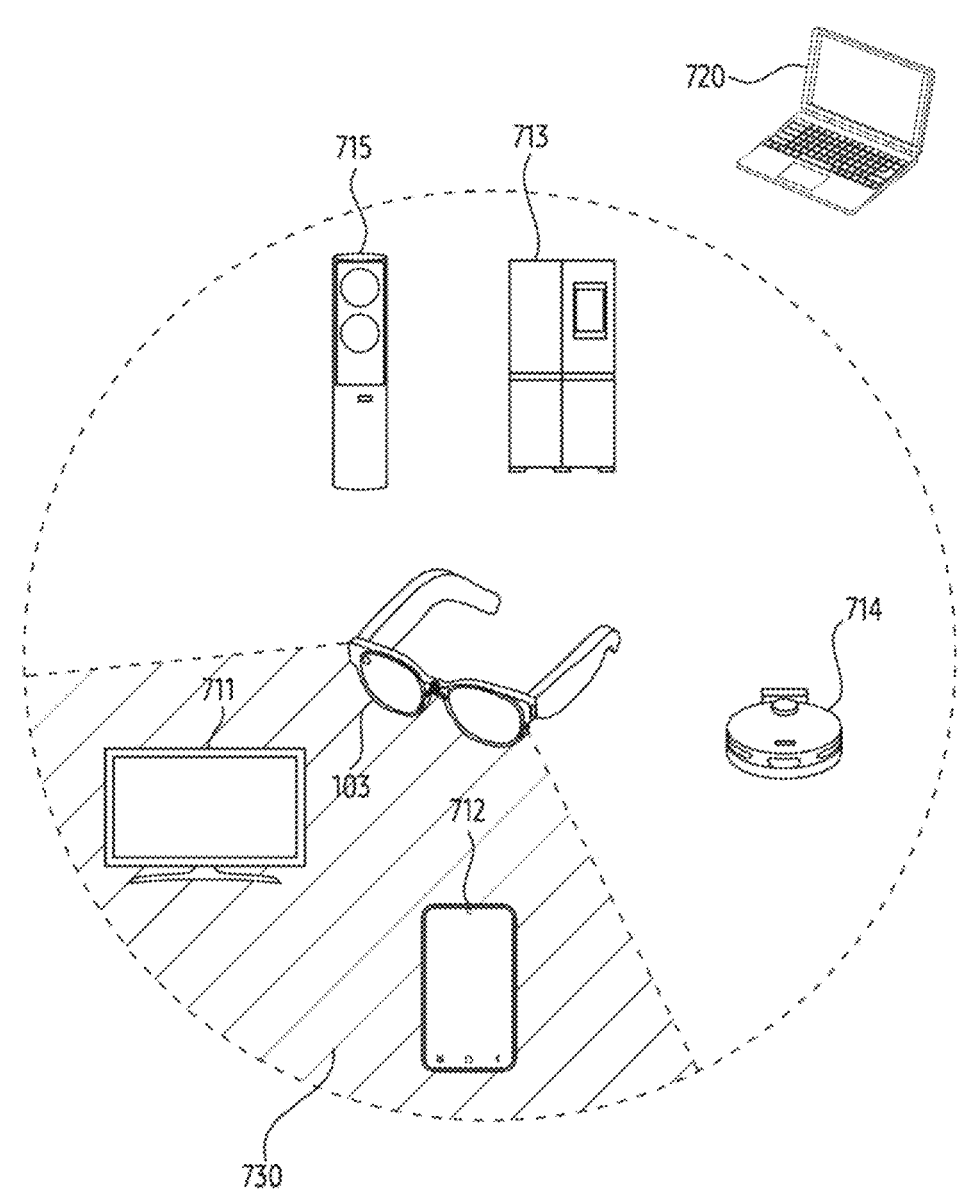
FIG. 7 illustrates an example of a method of a wearable device identifying a plurality of external electronic devices.

FIG. 7 illustrates an example of a method of a wearable device identifying a plurality of external electronic devices.

FIG. 7 illustrates an example of a method of the wearable device 103 identifying a plurality of external electronic devices based on a communication circuit and a FoV 730 of the wearable device 103. The wearable device 103 of FIG. 7 may include the wearable device 103 of FIG. 5. For example, the communication circuit may include a communication circuit 509.

Referring to FIG. 7, the wearable device 103 may identify one or more external electronic devices 711, 712, 713, 714, 715 based on the communication circuit 509. For example, the wearable device 103 may identify one or more external electronic devices 711, 712, 713, 714, 715 using short-range communication based on the communication circuit 509. However, embodiments of the disclosure are not limited thereto. For example, the wearable device 103 may identify one or more external electronic devices 711, 712, 713, 714, 715 based on wireless communication or wired communication technology different from the short-range communication.

According to an embodiment, the one or more external electronic devices 711, 712, 713, 714, 715 may include at least one of an electronic device connectable via short-range wireless communication using the communication circuit 509, an electronic device having the same account information as the account information of the wearable device 103 identified based on the communication circuit 509, an electronic device located within a specified distance from the wearable device 103 identified based on the communication circuit 509, or an electronic device connected to the same access point (AP) as the wearable device 103 identified based on the communication circuit 509. Referring to FIG. 7, the wearable device 103 may not be able to identify an external electronic device 720. For example, the external electronic device 720 may be different from the connectable electronic device, the electronic device having the same account information, the device located within the specified distance, and the electronic device connected to the same AP.

According to an embodiment, the wearable device 103 may identify the external electronic devices 711, 712 within the FoV 730 among the identified one or more external electronic devices 711, 712, 713, 714, 715. For example, the wearable device 103 may identify the external electronic devices 711, 712 to be displayed within the FoV 730 of the wearable device 103 among the one or more external electronic devices 711, 712, 713, 714, 715 based on the communication circuit 509.

According to an embodiment, the wearable device 103 may display through the display 503 a visual object representing a connection state of at least one of the external electronic devices 711, 712.

According to an embodiment, the wearable device 103 may identify an electronic device including the same account information as that of the wearable device 103 of the external electronic devices 711, 712 within the FoV 730. For example, the wearable device 103 may identify that the external electronic device 711 has the same account information as the wearable device 103, and the external electronic device 712 has different account information from the wearable device 103. For example, when the external electronic devices 711, 712 have the same account information, and thus, it may be difficult to distinguish between the external electronic devices 711, 712 based on their appearance, the wearable device 103 may distinguish between those devices by means of additional signaling. For example, the wearable device 103 may transmit a signal for scanning the devices. In the external electronic devices 711, 712, the distinction between devices may be performed through a screen (or UI) displayed based on the signal for the scan. The wearable device 103 may be referred to as an advertiser, and the external electronic devices 711, 712 may be referred to as a scan device. Alternatively, for example, a device not directly connected to the wearable device 103 among the external electronic devices 711, 712 may be distinguished by means of indirect signaling via another external electronic device (e.g., a server). Referring to the above description, the wearable device 103 may identify the plurality of connectable external electronic devices and may distinguish between the plurality of external electronic devices based on the FoV, account information, and additional signaling.

Figure 8A:
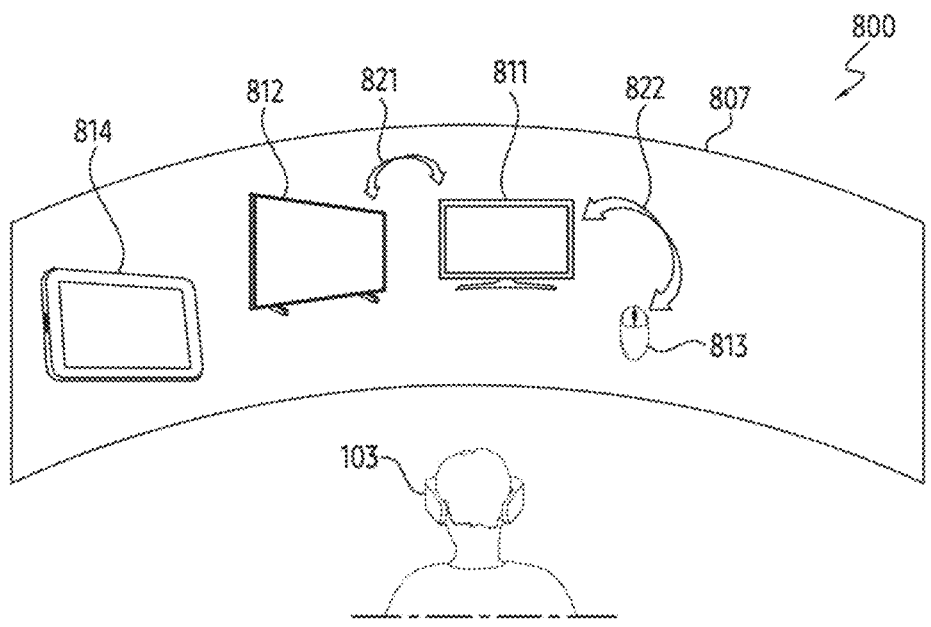
FIGS. 8A and 8B illustrate examples of a method of displaying visual objects representing a connection state of an external electronic device supporting a plurality of connection.
Figure 8B:
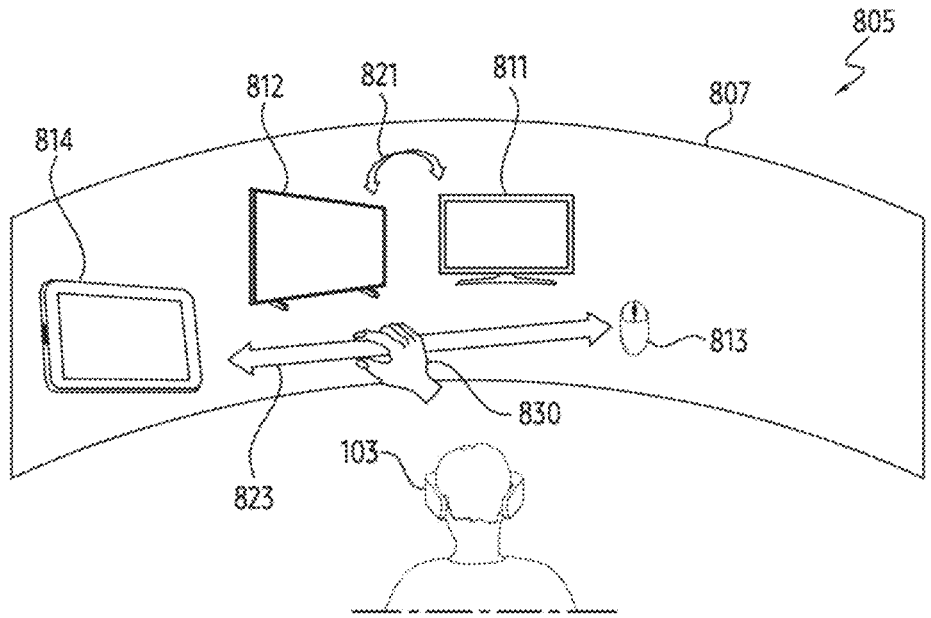

FIGS. 8A and 8B illustrate examples of a method of displaying visual objects representing a connection state of an external electronic device supporting a plurality of connections.

The wearable device 103 of FIGS. 8A and 8B may include the wearable device 103 of FIG. 5. The plurality of connections may include a connection for a multi-control service. For example, the multi-control service may indicate a function in which an electronic device controls a plurality of electronic devices connected thereto. In examples 800 and 805 of FIGS. 8A and 8B, the external electronic device 811 may support a multi-control service. The example 800 of FIG. 8A may illustrate an example of a connection for the multi-control service.

Referring to the example 800 of FIG. 8A, the wearable device 103 may display a plurality of external electronic devices 811, 812, 813, 814 in a FoV 807. For example, the wearable device 103 may display a plurality of external electronic devices 811, 812, 813, 814 within the FoV 807 through the display 503. In the example 800, for convenience of description, visual objects 821, 822 indicating connection states between the plurality of external electronic devices 811, 812, 813 within the FoV 807 are illustrated, but embodiments of the disclosure are not limited thereto. For example, when some of the plurality of external electronic devices 811, 812, 813, 814 are located outside the FoV 807, the wearable device 103 may not display the some of the plurality of external electronic devices.

Referring to the example 800, the wearable device 103 may display visual objects 821, 822 representing a connection state of the external electronic device 811. For example, the wearable device 103 may display a visual object 821 indicating a first connection between the external electronic device 811 and the external electronic device 812. Further, the wearable device 103 may display a visual object 822 indicating a second connection between the external electronic device 811 and the external electronic device 813.

According to an embodiment, using the multi-control, the user may perform a control of the external electronic device 811 for which the second connection is established and a control of the external electronic device 812 for which the first connection is established, based on an input to the external electronic device 813. Based on identifying the input to the external electronic device 813, the visual objects 821, 822 may be displayed.

Referring to the example 805 of FIG. 8B, the wearable device 103 may display another visual object indicating a third connection, based on identifying an input 830 about the visual object. For example, the wearable device 103 may identify the input 830 about the visual object 822 indicating the second connection. For example, the input 830 about the visual object 822 may cause the establishment of the third connection between the external electronic device 813 and the external electronic device 814. For example, the wearable device 103 may transmit a request signal for establishing the third connection to the external electronic device 813 and the external electronic device 814. In this case, the request signal transmitted to the external electronic device 813 may also request disconnection of the second connection. In addition, for example, the wearable device 103 may transmit a request signal for disconnecting the second connection to the external electronic device 811. Thereafter, the wearable device 103 may receive a response signal to the request signal. For example, the wearable device 103 may receive the response signal from the external electronic device 813 or the external electronic device 814. For example, the response signal may instruct establishment of the third connection. In response to receiving the response signal, the wearable device 103 may display a visual object 823 indicating the third connection.

In the examples 800 and 805 of FIGS. 8A and 8B, displaying of the visual objects 821, 822, 823 are shown, but embodiments of the disclosure are not limited thereto. For example, as in the example 800 of FIG. 8A, the first connection and the second connection are established with respect to the external electronic device 811 supporting the multi-control, but the visual objects 821, 822 may not be displayed. Then, the visual objects 821, 822 may be displayed based on identifying an event associated with the second connection (e.g., the input 830 for changing the second connection to the third connection). And then, when the connection state is switched from the second connection to the third connection based on the input 830, the visual objects 821, 823 may be displayed.

Figure 9:
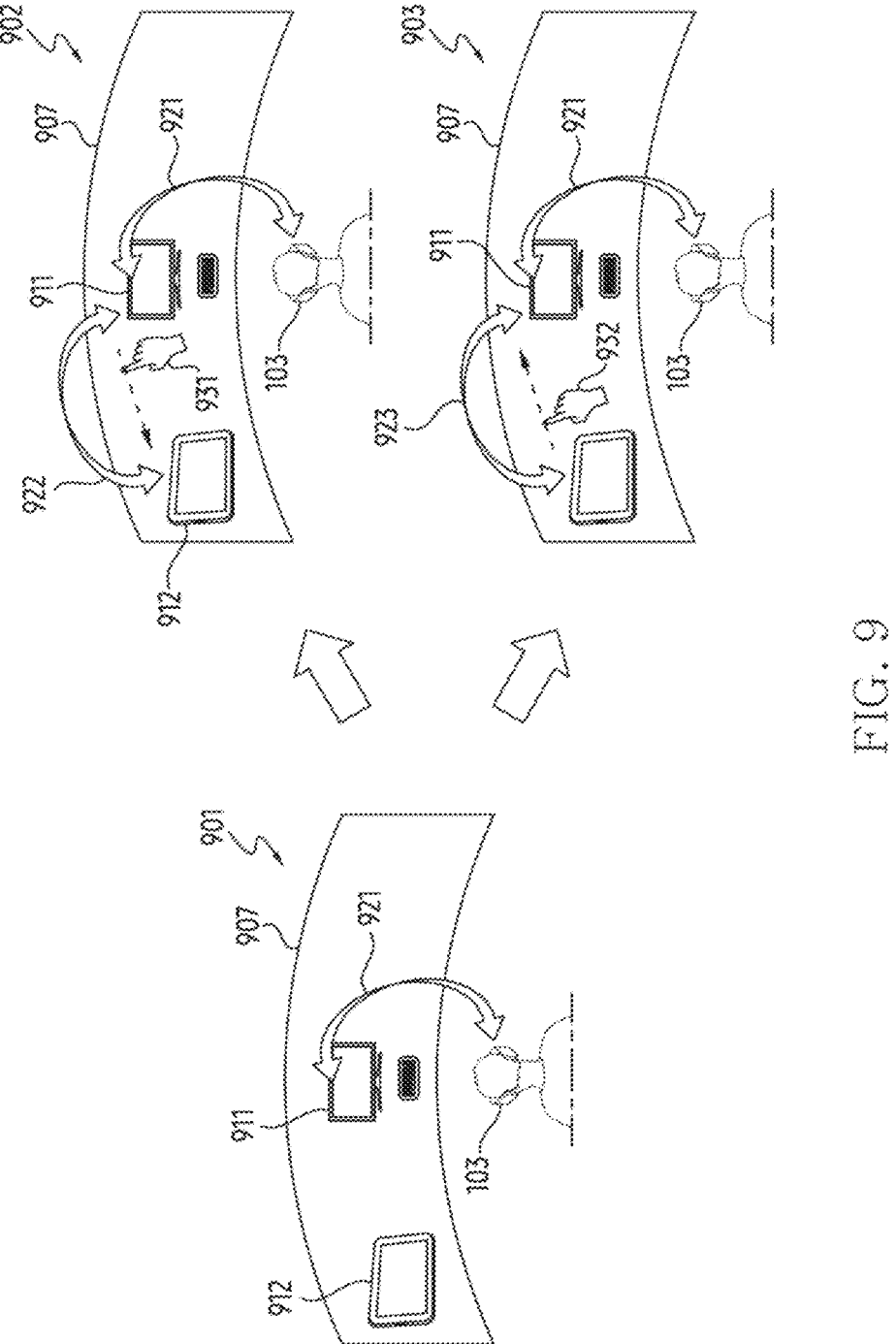
FIG. 9 illustrates an example of a method of establishing a connection based on an input to a visual object representing a connection state and displaying the visual object according to the established connection.

FIG. 9 illustrates an example of a method of establishing a connection based on an input to a visual object representing a connection state and displaying a visual object according to the established connection.

The wearable device 103 of FIG. 9 may illustrate an example of the wearable device 103 of FIG. 5. FIG. 9 illustrates an example 901 of displaying a visual object 921 indicating a first connection between the wearable device 103 and the external electronic device 911, and examples 902 and 903 of displaying a visual object 922 or a visual object 923 indicating a second connection between the external electronic device 911 and the external electronic device 912.

Referring to the example 901, the wearable device 103 may display a visual object 921 indicating the first connection, based on identifying an input to the external electronic device 911. For example, the wearable device 103 may identify the input to the external electronic device 911 within the FoV 907, and may display the visual object 921 based on the input. The FoV 907 of the wearable device 103 may include a real environment (e.g., an AR environment) viewed through the camera of the wearable device 103 or an image (e.g., a VR environment) rendered for the real environment.

According to an embodiment, the input may include a drag input 931 from the external electronic device 911 toward the external electronic device 912 or a drag input 932 from the external electronic device 911 toward the external electronic device 912. Referring to the example 902, the wearable device 103 may identify the drag input 931. In contrast, referring to the example 903, the wearable device 103 may identify the drag input 932.

Referring to the example 902, the wearable device 103 may transmit a request signal to the external electronic device 911 and the external electronic device 912 based on identifying the drag input 931. For example, the request signal based on the drag input 931 may be used to establish the second connection for a first function. For example, the first function may include a function of controlling the external electronic device 911 based on a touch input to the external electronic device 912. However, embodiments of the disclosure are not limited thereto. For example, the first function may include another function. Based on receiving the response signal indicating that the second connection for the first function is established, the wearable device 103 may display a visual object 922. For example, the visual object 922 may include information on the second connection for the first function. For example, the information on the second connection for the first function may include information on the first function, whether data is being transmitted or received by the second connection, the time at which the second connection was established, the type of the second connection (e.g., BT or Wi-Fi), the communication state of the second connection (e.g., signal quality), or the subject of the second connection (e.g., information for distinguishing between a pairing device and a connection device in the case of BT).

Referring to the example 903, the wearable device 103 may transmit a request signal to the external electronic device 911 and the external electronic device 912, based on identifying the drag input 932. For example, the request signal based on the drag input 932 may be used to establish the second connection for a second function different from the first function. For example, the second function may include a screen mirroring function for displaying, on the external electronic device 911, a screen displayed on the external electronic device 912. However, embodiments of the disclosure are not limited thereto. For example, the second function may include another function. Based on receiving the response signal indicating that the second connection for the second function is established, the wearable device 103 may display the visual object 923. For example, the visual object 923 may include information on the second connection for the second function. For example, the information on the second connection for the second function may include information on the second function, whether data is being transmitted or received by the second connection, the time at which the second connection was established, the type of the second connection (e.g., BT or Wi-Fi), the communication state of the second connection (e.g., signal quality), or the subject of the second connection (e.g., information for distinguishing between a pairing device and a connection device in the case of BT).

FIG. 9 illustrates that the visual object 922 indicating the second connection for the first function and the visual object 923 indicating the second connection for the second function have the same shape as each other, but embodiments of the disclosure are not limited thereto. For example, the visual object 922 indicating the second connection for the first function and the visual object 923 indicating the second connection for the second function may be formed in different shapes.

Figure 10A:
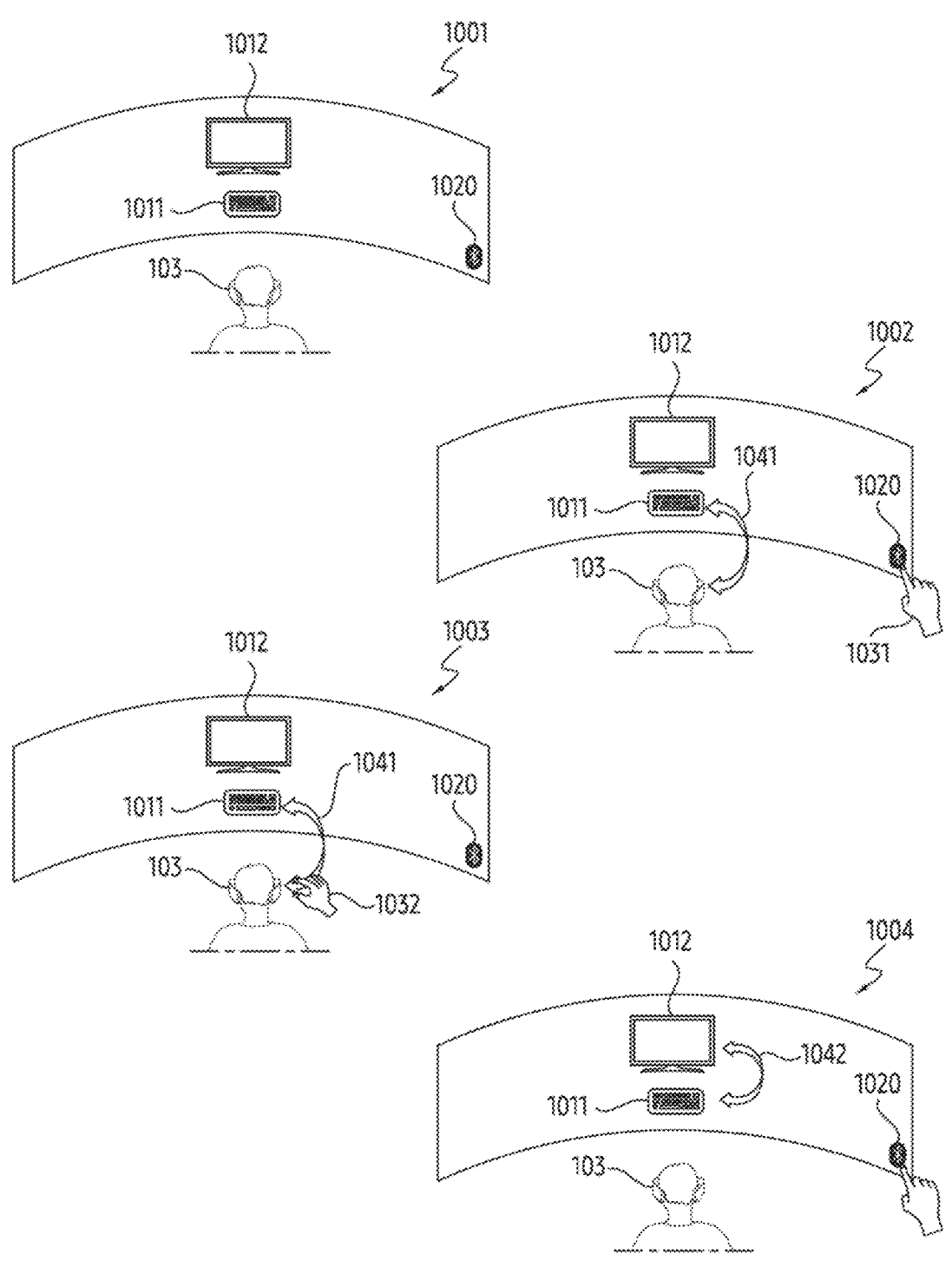
FIG. 10A illustrates an example of a method of displaying a visual object representing a connection state of an external electronic device and displaying another visual object based on an input about the visual object.

FIG. 10A illustrates an example of a method of displaying a visual object representing a connection state of an external electronic device and displaying another visual object based on an input about the visual object.

The wearable device 103 of FIG. 10A may illustrate an example of the wearable device 103 of FIG. 5. FIG. 10A illustrates examples 1001, 1002, 1003, 1004 of displaying a visual object 1041 indicating a first connection between the wearable device 103 and an external electronic device 1011 and displaying a visual object 1042 indicating a second connection between the external electronic device 1011 and an external electronic device 1012.

Referring to the example 1001, the wearable device 103 may display the external electronic device 1011. The wearable device 103 may display the external electronic device 1012. The wearable device 103 may display an icon 1020 for a function of controlling connection. For example, the wearable device 103 may display a screen including the external electronic device 1011, the external electronic device 1012, and the icon 1020, through the display 503. In this case, the wearable device 103 may be in connection with the external electronic device 1011.

Referring to the example 1002, the wearable device 103 may display a visual object 1041 indicating the first connection, based on identifying an input 1031 to the icon 1020. For example, the wearable device 103 may obtain the input 1031. For example, the input 1031 may include a user's input to the screen. For example, the wearable device 103 may display a visual object 1041 in response to identifying the input 1031. FIG. 10A illustrates an example in which the visual object 1041 is displayed based on the input 1031, but embodiments of the disclosure are not limited thereto. For example, the wearable device 103 may identify an event based on voice recognition and may display a visual object 1041 according to the event. Further, for example, in the example 1002, the visual object 1041 indicating a connection is illustrated, but embodiments of the disclosure are not limited thereto. For example, the visual object 1041 may include information on the connection. For example, the information about the connection may include whether data is being transmitted or received by the connection, the time at which the connection was established, the type of the connection (e.g., BT or Wi-Fi), the communication state of the connection (e.g., signal quality), or the subject of the connection (e.g., information for distinguishing between a pairing device and a connection device in the case of BT). In addition, for example, the wearable device 103 may display the visual object 1041 indicating the connection and a visual object indicating a possibility of connection and a connection between other devices, based on the input 1031 to the icon 1020.

Referring to the example 1003, the wearable device 103 may identify an input 1032 about the visual object 1041. For example, the input 1032 may include a drag input for switching from the first connection to a second connection between the external electronic device 1011 and the external electronic device 1012. Based on identifying the drag input, the wearable device 103 may transmit a request signal for establishing the second connection to the external electronic device 1011 and the external electronic device 1012.

Referring to the example 1004, the wearable device 103 may display a visual object 1042 indicating the second connection. For example, the wearable device 103 may receive a response signal to the request signal from the external electronic device 1011 or the external electronic device 1012. For example, the wearable device 103 may display the visual object 1042 based on an operation of receiving the response signal indicating that the second connection is established.

Figure 10B:
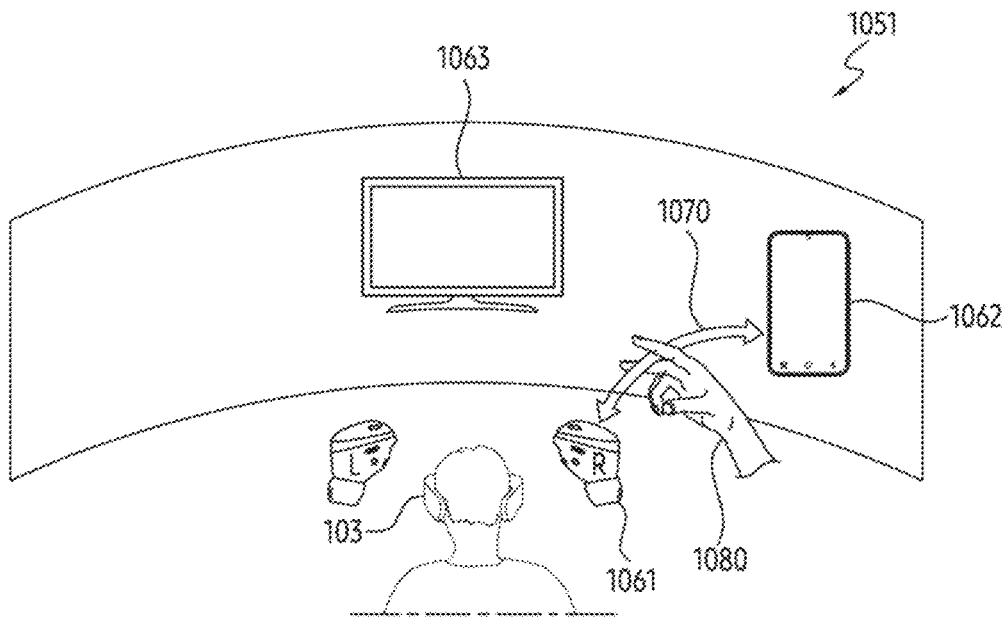
FIG. 10B illustrates an example of a method of displaying a visual object representing a connection state of an external electronic device and disconnecting the connection based on an input about the visual object.
Figure 10B:
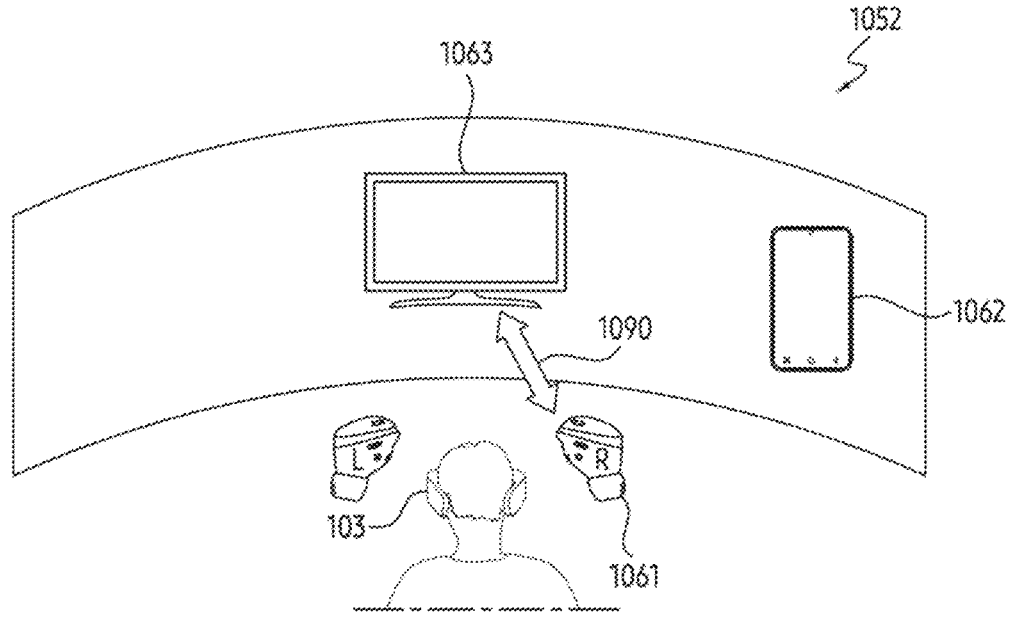

FIG. 10B illustrates an example of a method of displaying a visual object representing a connection state of an external electronic device and disconnecting the connection based on an input about the visual object.

The wearable device 103 of FIG. 10B may illustrate an example of the wearable device 103 of FIG. 5. FIG. 10B illustrates embodiments 1051 and 1052 of displaying a visual object 1070 indicating a third connection between an external electronic device 1061 and an external electronic device 1062, and disconnecting the third connection based on an input about the visual object.

Referring to an embodiment 1051, the wearable device 103 may display an external electronic device 1061, an external electronic device 1062, and an external electronic device 1063. For example, the wearable device 103 may display a screen including the external electronic device 1061, the external electronic device 1062, and the external electronic device 1063, through the display 503. Referring to the embodiment 1051, the wearable device 103 may display a visual object 1070 indicating the third connection between the external electronic device 1061 and the external electronic device 1062. For example, the wearable device 103 may display the visual object 1070 based on identifying an event associated with the third connection. For example, the event may include identifying an input to the external electronic device 1061 or the external electronic device 1062 or an input for changing the third connection.

According to an embodiment, the wearable device 103 may identify an input 1080 about the visual object 1070. For example, the input 1080 may include a gesture for disconnecting the third connection indicated by the visual object 1070. For example, the input 1080 may include the gesture of disconnecting a line portion of the visual object 1070. Based on identifying the input 1080, the wearable device 103 may transmit a request signal for disconnecting the third connection to the external electronic device 1061 and the external electronic device 1062.

Referring to an embodiment 1052, the wearable device 103 may receive a response signal to the request signal. For example, the wearable device 103 may cease displaying the visual object 1070, based on receiving the response signal indicating disconnection of the third connection.

Further, according to a specific connection policy, the external electronic device 1061 may be connected to the external electronic device 1063 in response to releasing of the third connection. For example, a fourth connection between the external electronic device 1061 and the external electronic device 1063 may be established. The wearable device 103 may identify that the fourth connection is established. For example, the wearable device 103 may identify establishing of the fourth connection, based on information obtained from the external electronic device 1061 connected with the wearable device 103 or information obtained from another electronic device (e.g., the external electronic device 540 or the server 530 of FIG. 5) connected with the external electronic device 1061. The wearable device 103 may display a visual object 1090 indicating the fourth connection.

Figure 11:
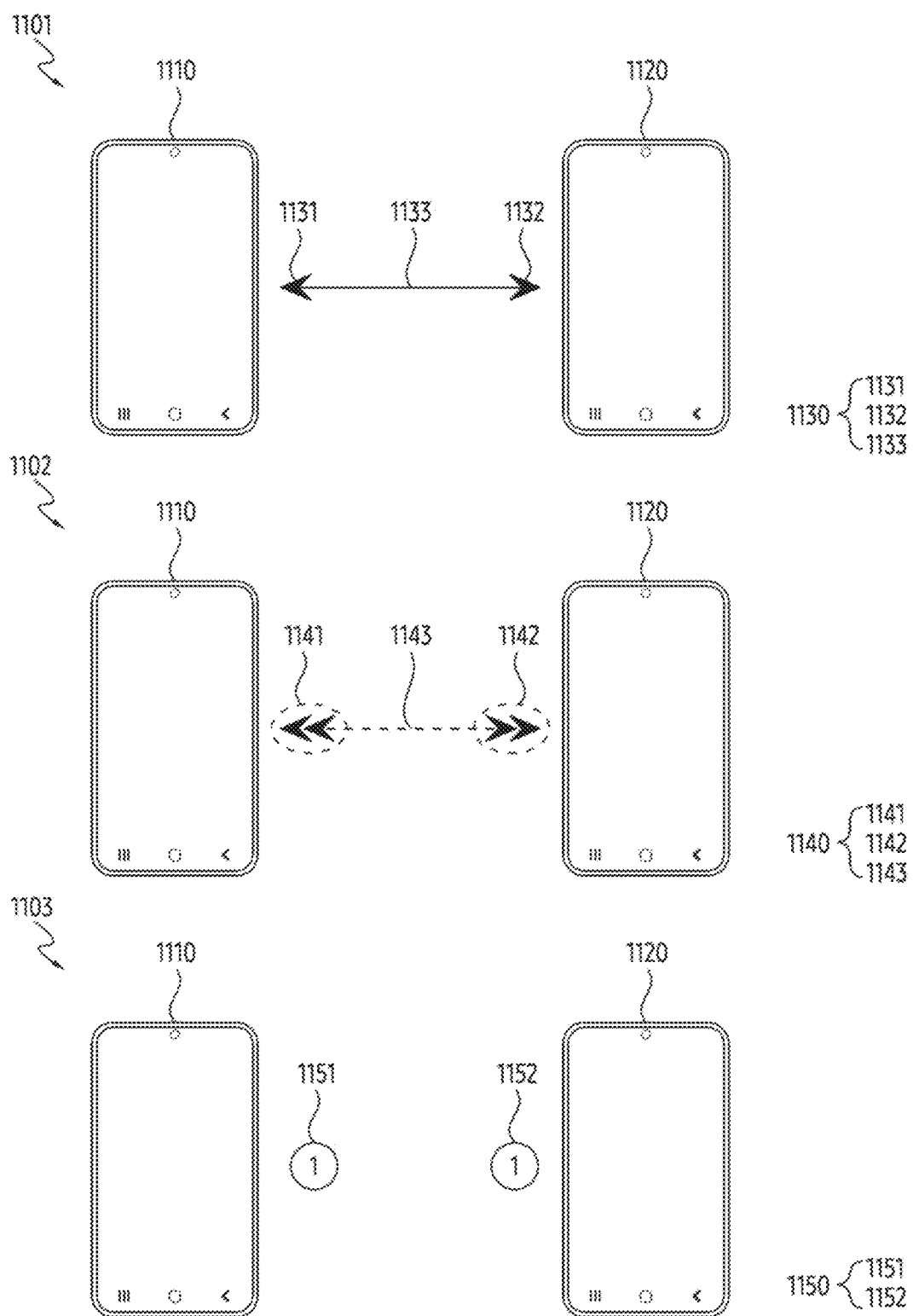
FIG. 11 illustrates examples of a visual object representing a connection state.

FIG. 11 illustrates examples of a visual object representing a connection state.

FIG. 11 illustrates embodiments 1101, 1102, 1103 of a visual object representing the connection state. For example, the connection state may include a connection between electronic devices and a possible connection between electronic devices.

Referring to an embodiment 1101, a visual object 1130 may be used to indicate a connection between the first electronic device 1110 and the second electronic device 1120. For example, the visual object 1130 may include a first icon 1131 indicating connection to the first electronic device 1110, a second icon 1132 indicating connection to the second electronic device 1120, and/or a line 1133 indicating connection between the first icon 1131 and the second icon 1132. For example, each of the first icon 1131 and the second icon 1132 may include an arrow. Alternatively, each of the first icon 1131 and the second icon 1132 may have the shape of a concentric plug (or socket or electrical outlet).

Referring to an embodiment 1102, a visual object 1140 may be used to indicate a connection between the first electronic device 1110 and the second electronic device 1120. For example, the visual object 1140 may include a first icon 1141 indicating connection to the first electronic device 1110, a second icon 1142 indicating connection to the second electronic device 1120, and a line 1143 indicating connection between the first icon 1141 and the second icon 1142. For example, each of the first icon 1141 and the second icon 1142 may include a plurality of arrows. However, embodiments of the disclosure are not limited thereto. The first icon 1141 and the second icon 1142 may correspond to the first icon 1131 and the second icon 1132, respectively. For example, the line 1143 may be displayed as an input about the visual object 1140 is identified. For example, the line 1143 may not be displayed when the visual object 1140 for indicating the connection between the first electronic device 1110 and the second electronic device 1120 is displayed. Then, when the input about the visual object 1140 is identified, the line 1143 may be displayed.

Referring to an embodiment 1103, a visual object 1150 may be used to indicate a connection between the first electronic device 1110 and the second electronic device 1120. For example, the visual object 1150 may include a first icon 1151 indicating that it is connected to the first electronic device 1110, and a second icon 1152 indicating that it is connected to the second electronic device 1120. For example, each of the first icon 1151 and the second icon 1152 may include an index. For example, the index may be used to map the order of the connection between the first electronic device 1110 and the second electronic device 1120 with the connected electronic devices. In an embodiment, the first icon and the second icon displayed in relation to other electronic devices for another connection may include another index (e.g., 2) different from the index (e.g., 1) included in the first icon 1151 and the second icon 1152.

FIG. 11 illustrates the visual objects 1130, 1140, 1150 including icons and lines, but embodiments of the disclosure are not limited thereto. For example, each of the visual objects (1130, 1140, 1150) may include only a line.

FIG. 11 illustrates the visual objects 1130, 1140, 1150 indicating connection, but embodiments of the disclosure are not limited thereto. For example, the visual objects 1130, 1140, 1150 may include information about the connection. For example, the information about the connection may include whether data is being transmitted or received by the connection, the time at which the connection was established, the type of the connection (e.g., BT or Wi-Fi), the communication state of the connection (e.g., signal quality), or the subject of the connection (e.g., information for distinguishing between a pairing device and a connection device in the case of BT).

FIG. 12 illustrates an example of a method for displaying a visual object representing a connection state between a wearable device and an external electronic device.

At least part of the method of FIG. 12 may be performed by the wearable device 103 of FIG. 5. For example, at least part of the methods may be controlled by the processor 501 of the wearable device 103. In the following embodiments, each operation may be performed sequentially, but is not necessarily performed sequentially. For example, the execution sequence of each operation may be changed, and at least two operations thereof may be performed in parallel.

In operation 1200, the wearable device 103 may detect (or identify) one or more external electronic devices using the communication circuit 509. For example, the one or more external electronic devices may include a first external electronic device.

In operation 1210, the wearable device 103 may establish a first connection with the first external electronic device. For example, the wearable device 103 may identify the first external electronic device of the one or more external electronic devices. The wearable device 103 may establish the first connection with the first external electronic device.

According to an embodiment, the wearable device 103 may identify the one or more external electronic devices. For example, the wearable device 103 may identify the one or more external electronic devices, based on the communication circuit 509. The one or more external electronic devices may include the first external electronic device. For example, the wearable device 103 may identify the one or more external electronic devices using short-range communication via the communication circuit 509.

According to an embodiment, the one or more external electronic devices may include at least one of an electronic device connectable through short-range wireless communication using the communication circuit 509, an electronic device having the same account information as the account information of the wearable device 103 identified based on the communication circuit 509, an electronic device located within a specified distance from the wearable device 103 identified based on the communication circuit 509, or an electronic device connected to the same AP as the wearable device 103 identified based on the communication circuit 509.

According to an embodiment, the wearable device 103 may identify connection states of the one or more external electronic devices. For example, the wearable device 103 may transmit a first signal to each of the one or more external electronic devices. For example, the wearable device 103 may broadcast or multicast the first signal to each of the one or more external electronic devices. According to an embodiment, the wearable device 103 may receive a second signal from at least some of the one or more external electronic devices, in response to the first signal. For example, each of the first signal and the second signal may be referred to as an advertising signal, an identification signal, a broadcasting signal, and a multicasting signal. According to an embodiment, the wearable device 103 may establish a connection with the at least some of the external electronic devices based on the second signal, or may identify the connection state thereof. For example, the wearable device 103 may transmit the first signal based on at least one of every specified period or a user input.

According to an embodiment, the first signal may include at least one of identification information of the wearable device 103, account information of the user of the wearable device 103, connection state information of the wearable device 103, connection record information of the wearable device 103, transmission strength information of the first signal, detection area information based on the first signal, battery information of the wearable device 103, or sound output information of the wearable device 103. Further, according to an embodiment, the second signal may include at least one of identification information of the first external electronic device, account information of the user of the first external electronic device, connection state information of the first external electronic device, connection record information of the first external electronic device, transmission strength information of the second signal, detection area information based on the second signal, battery information of the first external electronic device, or sound output information of the first external electronic device. The first external electronic device may be included in the at least some of the one or more external electronic devices.

According to an embodiment, the wearable device 103 may identify the first connection. For example, the first connection may include a connection between the first external electronic device and the wearable device 103 of the one or more external electronic devices. In an example, the wearable device 103 may identify the first connection, based on the first signal and the second signal.

In operation 1220, the wearable device 103 may obtain an image an environment of the wearable device 103 through the camera 507. For example, the wearable device 103 may obtain an image of a real environment around the wearable device 103 or an image of a virtual environment. The image may be related to the FoV of the wearable device 103.

In operation 1230, the wearable device 103 may identify a second external electronic device in the image. For example, the wearable device 103 may identify the second external electronic device within the FoV among the one or more external electronic devices. The direction to which the FoV is directed may change according to a gaze direction of the user wearing the wearable device 103.

In operation 1240, the wearable device 103 may display a first visual object indicating the first connection, based on identifying the event associated with the first connection. For example, based on identifying the event associated with the first connection, the wearable device 103 may display the first visual object indicating the first connection through the display 503.

According to an embodiment, the wearable device 103 may obtain the event from another external electronic device. For example, the other external electronic device may include the server 530 or the external electronic device 540 of FIG. 5. Alternatively, for example, the wearable device 103 may obtain the event from an external electronic device establishing the first connection with the wearable device 103, or the wearable device 103 may identify the event for the first connection. For example, based on identifying the event associated with the first connection, the wearable device 103 may generate (or render) the first visual object and may display the generated first visual object.

For example, the event associated with the first connection may include at least one of an input to a visual object for establishing a connection displayed through the display 503, receiving information for identifying whether a connection is possible to an external electronic device (e.g., the external electronic devices 520 of FIG. 5) or the wearable device 103, from the external electronic device (e.g., the server 530 or the external electronic device 540 of FIG. 5) connected to the wearable device 103, executing a function for performing a plurality of connections, an input for changing the connection.

According to an embodiment, the wearable device 103 may display the first visual object based on identifying (or receiving) the event. For example, the first visual object may include a visual object for displaying the first connection. For example, the wearable device 103 may display the first visual object for a specified time duration from the timing at which the event is identified. Alternatively, for example, when the movement of the user of the wearable device 103 is within a specified range, the wearable device 103 may display the first visual object.

According to an embodiment, the first visual object may be displayed with respect to the electronic devices that have established the first connection. For example, the wearable device 103 may display the first visual object between the wearable device 103 and the first external electronic device. For example, when the first external electronic device is located within the FoV, the first visual object may extend from the first external electronic device to the wearable device 103. Alternatively, when the first external electronic device is located outside the FoV, the first visual object may extend from an area corresponding to the location of the first external electronic device to the wearable device 103.

In operation 1250, the wearable device 103 may obtain an input about the first visual object. For example, the input may include an interaction performed by the user of the wearable device 103 on the first visual object.

In operation 1260, based on the input, the wearable device 103 may cease displaying of the first visual object and display a second visual object indicating a second connection. For example, the input obtained with respect to the first visual object may include an input for establishing the second connection between the first external electronic device and the second external electronic device. For example, the input obtained for the first visual object may include a drag (or drag-and-drop) input.

According to an embodiment, the wearable device 103 may transmit a request signal for establishing the second connection. For example, the wearable device 103 may transmit the request signal to the first external electronic device and the second external electronic device. In such a case, the request signal transmitted to the first external electronic device may be used to release (or disconnect) the first connection and request establishing the second connection. The request signal transmitted to the second external electronic device may be used to request establishing the second connection.

According to an embodiment, when the user input is the drag input, the second connection for executing a specified function may be established based on the direction of the drag input. For example, when the direction of the drag input is a first direction from the first external electronic device toward the second external electronic device, the second connection for executing a first function may be established. In contrast, when the direction of the drag input is a second direction from the second external electronic device toward the first external electronic device, the second connection for executing a second function different from the first function may be established. In this case, the wearable device 103 may transmit the request signal for establishing the second connection for executing the first function or the second function.

According to an embodiment, the wearable device 103 may receive a response signal. For example, the wearable device 103 may receive the response signal to the request signal. In the above example, the response signal may indicate that the second connection is established. For example, the response signal may be received from the first external electronic device or the second external electronic device. Based on receiving the response signal, the wearable device 103 may identify that the second connection is established.

According to an embodiment, the wearable device 103 may cease displaying the first visual object and display the second visual object, based on receiving the response signal. For example, the wearable device 103 may first cease displaying the first visual object and then display the second visual object, or may first display the second visual object and then cease displaying the first visual object. For example, the description of the first visual object may be substantially in the same manner applied to the description of the second visual object.

Referring to the foregoing description, an example is described in which the wearable device 103 displays the first visual object and the second visual object indicating a connection, but embodiments of the disclosure are not limited thereto. For example, each of the first visual object and the second visual object may include information about the connection. For example, the information about the connection may include whether data is being transmitted or received by the connection, the time at which the connection was established, the type of the connection (e.g., BT or Wi-Fi), the communication state of the connection (e.g., signal quality), or the subject of the connection (e.g., information for distinguishing between a pairing device and a connection device in the case of BT).

FIG. 13 illustrates an example of a method for displaying a visual object representing a connection state between external electronic devices.

At least part of the method of FIG. 13 may be performed by the wearable device 103 of FIG. 5. For example, at least part of the method may be controlled by the processor 501 of the wearable device 103. In the following embodiments, each operation may be performed sequentially, but is not necessarily performed sequentially. For example, the execution sequence of each operation may be changed, and at least two operations may be performed in parallel.

In operation 1300, the wearable device 103 may detect (or identify) one or more external electronic devices using the communication circuit 509. For example, the one or more external electronic devices may include a first external electronic device and a second external electronic device.

In operation 1310, the wearable device 103 may obtain an image of an environment of the wearable device 103 through the camera 507. For example, the wearable device 103 may obtain an image of a real environment around the wearable device 103 or an image of a virtual environment. The image may be related to the FoV of the wearable device 103.

In operation 1320, the wearable device 103 may identify the first external electronic device and the second external electronic device in the image. For example, the wearable device 103 may identify the first external electronic device and the second external electronic device among the one or more external electronic devices. In such a case, a first connection may have been established between the first external electronic device and the second external electronic device.

According to an embodiment, the wearable device 103 may identify the one or more external electronic devices. For example, the wearable device 103 may identify the one or more external electronic devices using the communication circuit 509. For example, the wearable device 103 may identify the one or more external electronic devices through short-range communication using the communication circuit 509.

According to an embodiment, the one or more external electronic devices may include at least one of an electronic device connectable through short-range wireless communication using the communication circuit 509, an electronic device having the same account information as the account information of the wearable device 103 identified based on the communication circuit 509, an electronic device located within a specified distance from the wearable device 103 identified based on the communication circuit 509, or an electronic device connected to the same AP as the wearable device 103 identified based on the communication circuit 509.

According to an embodiment, the wearable device 103 may identify connection states of the one or more external electronic devices. For example, the wearable device 103 may transmit a first signal to each of the one or more external electronic devices. For example, the wearable device 103 may broadcast or multicast the first signal to each of the one or more external electronic devices. According to an embodiment, the wearable device 103 may receive a second signal from at least some of the one or more external electronic devices, in response to the first signal. For example, each of the first signal and the second signal may be referred to as an advertising signal, an identification signal, a broadcasting signal, and a multicasting signal. According to an embodiment, the wearable device 103 may establish a connection with the at least some of the external electronic devices based on the second signal, or may identify the connection state of the at least some of the external electronic devices. For example, the wearable device 103 may transmit the first signal based on at least one of every specified period or a user input.

According to an embodiment, the first signal may include at least one of identification information of the wearable device 103, account information of the user of the wearable device 103, connection state information of the wearable device 103, connection record information of the wearable device 103, transmission strength information of the first signal, detection area information based on the first signal, battery information of the wearable device 103, or sound output information of the wearable device 103. According to an embodiment, the second signal may also include identification information of an external electronic device (e.g., the first external electronic device or the second external electronic device), account information of a user of an external electronic device (e.g., the first external electronic device or the second external electronic device), connection state information of an external electronic device (e.g., the first external electronic device or the second external electronic device), connection record information of an external electronic device (e.g., the first external electronic device or the second external electronic device), transmission strength information of the second signal, detection area information based on the second signal, battery information of an external electronic device (e.g., the first external electronic device or the second external electronic device) or sound output information of an external electronic device (e.g., the first external electronic device or the second external electronic device).

According to an embodiment, the wearable device 103 may identify the first connection. For example, the first connection may include a connection between the first external electronic device and the second external electronic device among the one or more external electronic devices. In an example, the wearable device 103 may identify the first connection, based on the first signal and the second signal.

In operation 1330, the wearable device 103 may display a first visual object indicating the first connection, based on identifying the event associated with the first connection. For example, based on identifying the event associated with the first connection, the wearable device 103 may display the first visual object indicating the first connection through the display 503.

According to an embodiment, the wearable device 103 may obtain the event from another external electronic device. For example, the other external electronic device may include the server 530 or the external electronic device 540 of FIG. 5. Alternatively, for example, the wearable device 103 may obtain the event from an external electronic device establishing the first connection with the wearable device 103, or the wearable device 103 may identify the event for the first connection. For example, based on identifying the event associated with the first connection, the wearable device 103 may generate (or render) the first visual object and display the generated first visual object.

For example, the event associated with the first connection may include at least one of an input to a visual object for establishing a connection displayed through the display 503, receiving information for identifying whether a connection is possible to an external electronic device (e.g., the external electronic devices 520 of FIG. 5) or the wearable device 103, from an external electronic device (e.g., the server 530 or the external electronic device 540 of FIG. 5) connected to the wearable device 103, executing a function for performing a plurality of connections, an input for changing the connection.

According to an embodiment, the wearable device 103 may display the first visual object based on identifying (or receiving) the event. For example, the first visual object may include a visual object for displaying the first connection. For example, the wearable device 103 may display the first visual object for a specified time duration from the timing at which the event is identified. Alternatively, for example, when the movement of the user of the wearable device 103 is within a specified range, the wearable device 103 may display the first visual object.

According to an embodiment, the first visual object may be displayed with respect to electronic devices that have established the first connection. For example, the wearable device 103 may display the first visual object between the first external electronic device and the second external electronic device. For example, when the first external electronic device is located within the FoV, the first visual object may extend from the first external electronic device to the second external electronic device. Alternatively, when the first external electronic device is located outside the FoV, the first visual object may extend from an area corresponding to the location of the first external electronic device to the second external electronic device.

In operation 1340, the wearable device 103 may obtain an input about the first visual object. For example, the input may include an interaction performed by the user of the wearable device 103 for the first visual object.

In operation 1350, based on the input, the wearable device 103 may cease displaying the first visual object and display a second visual object indicating a second connection. For example, the input obtained with respect to the first visual object may include an input for establishing the second connection between the second external electronic device and a third external electronic device. For example, the input obtained with respect to the first visual object may include a drag (or drag-and-drop) input. The third external electronic device may be included in the one or more external electronic devices.

According to an embodiment, the wearable device 103 may transmit a request signal for establishing the second connection. For example, the wearable device 103 may transmit the request signal to the first external electronic device, the second external electronic device, and the third external electronic device. In this case, the request signal transmitted to the first external electronic device may be used to request releasing (or disconnecting) the first connection. The request signal transmitted to the second external electronic device may be used to request releasing the first connection and establishing the second connection. The request signal transmitted to the third external electronic device may be used to request establishing the second connection.

According to an embodiment, when the user input is the drag input, the second connection for executing a specified function may be established based on the direction of the drag input. For example, when the direction of the drag input is a first direction from the second external electronic device toward the third external electronic device, the second connection for executing a first function may be established. In contrast, when the direction of the drag input is a second direction from the third external electronic device toward the second external electronic device, the second connection for executing a second function different from the first function may be established. In this case, the wearable device 103 may transmit the request signal for establishing the second connection for executing the first function or the second function.

According to an embodiment, the wearable device 103 may receive a response signal. For example, the wearable device 103 may receive the response signal to the request signal. In the above example, the response signal may indicate that the second connection is established. For example, the response signal may be received from the second external electronic device or the third external electronic device. Based on receiving the response signal, the wearable device 103 may identify that the second connection is established.

According to an embodiment, the wearable device 103 may cease displaying the first visual object and display the second visual object, based on receiving the response signal. For example, the wearable device 103 may first cease displaying the first visual object and then display the second visual object, or may first display the second visual object and then cease displaying the first visual object. For example, the description of the first visual object may be substantially in the same way applied to the description of the second visual object.

Referring to the foregoing description, an example is described in which the wearable device 103 displays the first visual object and the second visual object indicating a connection, but embodiments of the disclosure are not limited thereto. For example, each of the first visual object and the second visual object may include information about the connection. For example, the information about the connection may include whether data is being transmitted or received by the connection, the time at which the connection was established, the type of the connection (e.g., BT or Wi-Fi), a communication state of the connection (e.g., signal quality), or the subject of the connection (e.g., information for distinguishing between a pairing device and a connection device in the case of BT).

As described above, a wearable device 103 may comprise a display 503. The wearable device 103 may comprise a communication circuit 509. The wearable device 103 may comprise a camera 507. The wearable device 103 may comprise at least one processor 501 comprising processing circuitry. The wearable device 103 may comprise memory, comprising one or more storage mediums, storing instructions. The instructions, when executed by the at least one processor 501 individually or collectively, may cause the wearable device 103 to detect a plurality of external electronic devices using the communication circuit 509. The instructions, when executed by the at least one processor 501 individually or collectively, may cause the wearable device 103 to establish a first connection with a first external electronic device of the plurality of external electronic devices using the communication circuit 509. The instructions, when executed by the at least one processor 501 individually or collectively, may cause the wearable device 103 to obtain an image of an environment of the wearable device through the camera 507. The instructions, when executed by the at least one processor 501 individually or collectively, may cause the wearable device 103 to identify a second external electronic device of the plurality of external electronic devices within the image. The instructions, when executed by the at least one processor 501 individually or collectively, may cause the wearable device 103 to display, through the display 503, a first visual object representing the first connection based on identifying an event associated with the first connection. The instructions, when executed by the at least one processor 501 individually or collectively, may cause the wearable device 103 to obtain an input for the first visual object for establishing a second connection between the first external electronic device and a second external electronic device. The instructions, when executed by the at least one processor 501 individually or collectively, may cause the wearable device 103 to, based on the input, cease displaying of the first visual object and display, through the display 503, a second visual object representing the second connection.

According to an embodiment, the instructions, when executed by the at least one processor 501 individually or collectively, may cause the wearable device 103 to transmit, to each of the plurality of external electronic devices, a first signal. The instructions, when executed by the at least one processor 501 individually or collectively, may cause the wearable device 103 to receive, from the first external electronic device, a second signal in response to the first signal. The instructions, when executed by the at least one processor 501 individually or collectively, may cause the wearable device 103 to establish the first connection based the second signal.

According to an embodiment, the first signal may include at least one of identification information of the wearable device 103, account information of a user of the wearable device 103, connection state information of the wearable device 103, connection history information of the wearable device 103, or transmission strength information of the first signal. The second signal may include at least one of identification information of the first external electronic device, account information of a user of the first external electronic device, connection state information of the first external electronic device, connection history information of the first external electronic device, or transmission strength information of the second signal.

According to an embodiment, the plurality of external electronic devices may include at least one of an electronic device having the same account information as account information of the wearable device 103 identified based on the communication circuit 509, or an electronic device in which a distance from the wearable device 103 identified based on the communication circuit 509 is within a specified distance.

According to an embodiment, the event associated with the first connection may include at least one of an input with respect to a visual object for establishing the first connection displayed through the display 503, reception, from a third external electronic device connected to the wearable device 103, of information confirming whether connection to the first external electronic device or the wearable device 103 is available or not, an execution of a function for performing multiple connections, or an input for changing the first connection.

According to an embodiment, the first visual object may be displayed within a designated time length from a timing at which the event is identified or while movement of a user of the wearable device 103 is within a designated range.

According to an embodiment, the first visual object may include a line representing connection between the first external electronic device and the wearable device 103.

According to an embodiment, the first visual object may be extended from the first external electronic device to the wearable device 103, in a case that the first external electronic device is positioned within a field of view (FoV). The first visual object may be extended from an area corresponding to a position of the first external electronic device within the FoV to the wearable device 103, in a case that the first external electronic device is positioned outside the FoV.

According to an embodiment, the instructions, when executed by the at least one processor 501 individually or collectively, may cause the wearable device 103 to transmit, to the first external electronic device, a capability information inquiry message for requesting information on an electronic device to which the first external electronic device is connectable. The instructions, when executed by the at least one processor 501 individually or collectively, may cause the wearable device 103 to receive, from the first external electronic device, the capability information message indicating one or more electronic devices connectable by the first external electronic device including the second external electronic device, in response to the capability information inquiry message.

According to an embodiment, the instructions, when executed by the at least one processor 501 individually or collectively, may cause the wearable device 103 to identify the event associated with the first connection. The at least one processor 501 may be further configured to display an indicator indicating that connection between the first external electronic device and the second external electronic device identified based on the capability information message is available, together with the first visual object representing the first connection in response to identifying the event associated with the first connection.

According to an embodiment, the instructions, when executed by the at least one processor 501 individually or collectively, may cause the wearable device 103 to transmit a request signal for establishing of the second connection and for disconnecting the first connection to the first external electronic device and another request signal for establishing of the second connection to the second external electronic device, in response to obtaining the input. The instructions, when executed by the at least one processor 501 individually or collectively, may cause the wearable device 103 to receive, from the first external electronic device or the second external electronic device, a response signal indicating that the second connection has been established. The instructions, when executed by the at least one processor 501 individually or collectively, may cause the wearable device 103 to, in response to receiving the response signal, cease displaying of the first visual object and display the second visual object representing the second connection.

According to an embodiment, the request signal may be used to establish the second connection for executing a first function, in a case that a first input is directed from the first external electronic device to the second external electronic device. The request signal may be used to establish the second connection for executing a second function, in a case that a second input is directed from the second external electronic device to the first external electronic device.

According to an embodiment, the at least one processor 501 may be further configured to display, through the display 503, a third visual object representing a third connection between the first external electronic device and a third external electronic device connected to the first external electronic device, based on identifying the event associated with the first connection.

According to an embodiment, the instructions, when executed by the at least one processor 501 individually or collectively, may cause the wearable device 103 to, based on another input obtained with respect to the third visual object for disconnection of the third connection, transmit, to each of the first external electronic device and the third external electronic device, a request signal for the disconnection of the third connection. According to an embodiment, The instructions, when executed by the at least one processor 501 individually or collectively, may cause the wearable device 103 to receive, from the first external electronic device or the third external electronic device, a response signal that the third connection has been disconnected. According to an embodiment, The instructions, when executed by the at least one processor 501 individually or collectively, may cause the wearable device 103 to cease displaying of the third visual object in response to receiving the response signal.

As described above, a wearable device 103 may comprise a display 503. The wearable device 103 may comprise a camera. The wearable device 103 may comprise a communication circuit. The wearable device 103 may comprise at least one processor comprising processing circuitry. The wearable device 103 may memory, comprising one or more storage mediums. The instructions, when executed by the at least one processor 501 individually or collectively, may cause the wearable device 103 to detect a plurality of external electronic devices using the communication circuit 509. The instructions, when executed by the at least one processor 501 individually or collectively, may cause the wearable device 103 to obtain an image of an environment of the wearable device 103 through the camera. The instructions, when executed by the at least one processor 501 individually or collectively, may cause the wearable device 103 to identify a first external electronic device and a second external electronic device within the image of the plurality of external electronic devices using the communication circuit 509. The instructions, when executed by the at least one processor 501 individually or collectively, may cause the wearable device 103 to display, through the display 503, a first visual object representing the first connection, based on identifying an event associated with a first connection between the first external electronic device and the second external electronic device. The instructions, when executed by the at least one processor 501 individually or collectively, may cause the wearable device 103 to obtain an input for the first visual object for establishing a second connection between the second external electronic device and a third external electronic device of the plurality of external electronic devices. The instructions, when executed by the at least one processor 501 individually or collectively, may cause the wearable device 103 to, based on the input, cease displaying of the first visual object and display, through the display 503, a second visual object representing the second connection.

According to an embodiment, The instructions, when executed by the at least one processor 501 individually or collectively, may cause the wearable device 103 to transmit, to each of the plurality of external electronic devices, a first signal. The instructions, when executed by the at least one processor 501 individually or collectively, may cause the wearable device 103 to receive, from the first external electronic device, a second signal in response to the first signal. The instructions, when executed by the at least one processor 501 individually or collectively, may cause the wearable device 103 to receive, from the second external electronic device, a third signal in response to the first signal. The instructions, when executed by the at least one processor 501 individually or collectively, may cause the wearable device 103 to identify the first connection based the second signal or the third signal.

According to an embodiment, wherein the plurality of external electronic devices may include at least one of an electronic device having the same account information as account information of the wearable device 103 identified based on the communication circuit 509, or an electronic device in which a distance from the wearable device 103 identified based on the communication circuit 509 is within a specified distance.

According to an embodiment, the event associated with the first connection may include at least one of an input with respect to a visual object for establishing the first connection displayed through the display 503, reception, from a fourth external electronic device connected to the wearable device 103, of information confirming whether connection to the first external electronic device or the second device is available or not, an execution of a function for performing multiple connections, or an input for changing the first connection.

According to an embodiment, the first visual object may include a line representing connection between the first external electronic device and the second external electronic device.

According to an embodiment, the instructions, when executed by the at least one processor 501 individually or collectively, may cause the wearable device 103 to transmit, to each of the first external electronic device and the second external electronic device, a request signal for establishing of the second connection and for disconnecting the first connection, in response to obtaining the input. The instructions, when executed by the at least one processor 501 individually or collectively, may cause the wearable device 103 to receive, from the second external electronic device or the third external electronic device, a response signal indicating that the second connection has been established. The instructions, when executed by the at least one processor 501 individually or collectively, may cause the wearable device 103 to, in response to receiving the response signal, cease displaying of the first visual object and display the second visual object representing the second connection.

The electronic device according to one or more embodiments disclosed herein may be one of various types of electronic devices. The electronic devices may include, for example, a portable communication device (e.g., a smartphone), a computer device, a portable multimedia device, a portable medical device, a camera, a wearable device, or a home appliance. According to an embodiment, the electronic devices are not limited to those described above.

It should be appreciated that one or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may be interchangeably used with other terms, for example, "logic", "logic block", "part", or "circuit". A module may be a single integral component, or a minimum unit or part thereof, adapted to perform one or more functions. For example, according to an example, the module may be implemented in a form of an application-specific integrated circuit (ASIC).

One or more embodiments as set forth herein may be implemented as software (e.g., a program 140) including one or more instructions that are stored in a storage medium (e.g., an internal memory 136 or an external memory 138) that is readable by a machine (e.g., an electronic device 101). For example, a processor (e.g., a processor 120 of an electronic device 101) of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments of the disclosure, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means".

What is claimed is:

1. A wearable device comprising:
   a display;
   a camera;
   communication circuitry;
   at least one processor comprising processing circuitry; and
   memory, comprising one or more storage mediums, storing instructions,
   wherein the instructions, when executed by the at least one processor individually or collectively, cause the wearable device to:
      identify a plurality of external electronic devices including a first external electronic device and a second external electronic device, using the communication circuitry;
      establish a first connection between the wearable device and the first external electronic device, using the communication circuitry;
      obtain an image through the camera;
      based on the first connection, display, through the display, a user interface (UI) object superimposed on the image obtained through the camera for indicating that the first connection is established between the wearable device and the first external electronic device, wherein the UI object is visually connected with a first visual object representing of the first external electronic device included in the image;
      obtain an input for moving the UI object for changing a connection device of the first external electronic device; and
      based on movement of the UI object caused by the input being identified as visually connecting the first visual object representing the first external electronic device and a second visual object representing the second external electronic device, transmit signals to the first external electronic device and the second external electronic device for a second connection between the first external electronic device and the second external electronic device.

2. The wearable device of claim 1, wherein the instructions, when executed by the at least one processor individually or collectively, further cause the wearable device to:
   transmit, to each of the plurality of external electronic devices, a connection signal;
   receive, from the first external electronic device, a response signal of the connection signal; and
   establish the first connection, based on the response signal of the connection signal.

3. The wearable device of claim 2, wherein the connection signal comprises at least one of identification information of the wearable device, account information of a user of the wearable device, connection state information of the wearable device, connection history information of the wearable device, or transmission strength information of the connection signal, and wherein the response signal comprises at least one of identification information of the first external electronic device, account information of a user of the first external electronic device, connection state information of the first external electronic device, connection history information of the first external electronic device, or transmission strength information of the response signal of the connection signal.

4. The wearable device of claim 1, wherein the plurality of external electronic devices comprises at least one of:

an electronic device having account information that is the same as account information of the wearable device, or an electronic device in which a distance from the wearable device is within a specified distance.

5. The wearable device of claim 1, wherein the instructions, when executed by the at least one processor individually or collectively, cause the wearable device to, based on identifying an event associated with the first connection, display the UI object indicating the first connection between the wearable device and the first external electronic device, and wherein the event associated with the first connection comprises at least one of:

receiving an input with respect to a visual object used for establishing the first connection between the wearable device and the first external electronic device, receiving, from a third external electronic device connected to the wearable device, information confirming whether connection to the first external electronic device or the wearable device is available, an execution of a function for performing multiple connections, or an input for changing a state of the first connection.

6. The wearable device of claim 5, wherein the UI object indicating the first connection is displayed within a designated time length from a timing at which the event is identified or while movement of a user of the wearable device is within a designated range.

7. The wearable device of claim 1, wherein the UI object indicating the first connection is extended from the first external electronic device to the wearable device, in case that the first external electronic device is positioned within a field of view (FoV) of the wearable device, and wherein the UI object indicating the first connection is extended from an area corresponding to a position of the first external electronic device within the FoV to the wearable device, in case that the first external electronic device is positioned outside the FoV.

8. The wearable device of claim 1, wherein the instructions, when executed by the at least one processor individually or collectively, further cause the wearable device to:

transmit, to the first external electronic device, a capability information inquiry message for requesting information on an electronic device to which the first external electronic device is connectable; and receive, from the first external electronic device in response to the capability information inquiry message, a capability information message indicating one or more electronic devices connectable by the first external electronic device including the second external electronic device.

9. The wearable device of claim 8, wherein the instructions, when executed by the at least one processor individually or collectively, further cause the wearable device to:

identify an event associated with the first connection; and based on the identifying the event associated with the first connection, display an indicator together with the first visual object, and wherein the indicator indicates that, based on the capability information message, the second connection between the first external electronic device and the second external electronic device identified is available.

10. The wearable device of claim 1, wherein the signals transmitted to the first external electronic device and the second external electronic device comprise:

a first request signal, transmitted to the first external electronic device, for requesting an establishment of the second connection with the second external electronic device, and a second request signal, transmitted to the second external electronic device, for requesting the establishment of the second connection with the first external electronic device, and wherein the instructions, when executed by the at least one processor individually or collectively, further cause the wearable device to:

based on receiving a first response signal of the first request signal and a second response signal of the second request signal indicating that the second connection is established, release the first connection with the first external electronic device.

11. The wearable device of claim 1, wherein the instructions, when executed by the at least one processor individually or collectively, cause the wearable device to:

in a case that a first user input directed from the first visual object to the second visual object is received on the image, transmit, to the first external electronic device and the second external electronic device, a first command for causing the first external electronic device and the second external electronic device to perform a first function for interaction between the first external electronic device and the second external electronic device; and in a case that a second user input directed from the second visual object to the first visual object is received on the image, transmit, to the first external electronic device and the second external electronic device, a second command for causing the first external electronic device and the second external electronic device to perform a second function for the interaction between the first external electronic device and the second external electronic device.

12. The wearable device of claim 1, wherein the instructions, when executed by the at least one processor individually or collectively, further cause the wearable device to:

based on identifying an event associated with the first connection, display, through the display, a second UI object visually connecting the first visual object representing the first external electronic device and a third visual object representing a third external electronic device included in the image, and wherein the second UI object indicates a third connection established between the first external electronic device and the third external electronic device.

13. The wearable device of claim 12, wherein the instructions, when executed by the at least one processor individually or collectively, further cause the wearable device to:

based on another user input obtained with respect to the second UI object for breaking a visual connection between the first visual object and the third visual object, transmit, to the first external electronic device and the third external electronic device, other signals for a disconnection of the third connection;

receive, from the first external electronic device or the third external electronic device, other response signals indicating that the third connection is disconnected; and based on receiving the other response signals, remove the third visual object from the image.

14. A method performed by a wearable device, the method comprising:

identifying a plurality of external electronic devices including a first external electronic device and a second external electronic device;

establishing a first connection between the wearable device and the first external electronic device;

obtaining an image through a camera;

based on the first connection, displaying a user interface (UI) object superimposed on the image obtained through the camera for indicating that the first connection is established between the wearable device and the first external electronic device, wherein the UI object is visually connected with a first visual object representing the first external electronic device included in the image;

obtaining an input for moving the UI object for changing a connection device of the first external electronic device;

based on movement of the UI object caused by the input being identified as visually connecting the first visual object representing the first external electronic device and a second visual object representing the second external electronic device, transmitting signals to the first external electronic device and the second external electronic device for a second connection between the first external electronic device and the second external electronic device.

15. The method of claim 14, the method comprising:

transmitting, to each of the plurality of external electronic devices, a connection signal;

receiving, from the first external electronic device, a response signal of the connection signal; and establishing the first connection, based on the response signal of the connection signal.

16. The method of claim 15, wherein the connection signal comprises at least one of identification information of the wearable device, account information of a user of the wearable device, connection state information of the wearable device, connection history information of the wearable device, or transmission strength information of the connection signal, and wherein the response signal comprises at least one of identification information of the first external electronic device, account information of a user of the first external electronic device, connection state information of the first external electronic device, connection history information of the first external electronic device, or transmission strength information of the response signal.

17. The method of claim 14, wherein the plurality of external electronic devices comprises at least one of:

an electronic device having account information that is the same as account information of the wearable device, or an electronic device in which a distance from the wearable device is within a specified distance.

18. The method of claim 14, further comprising:

based on identifying an event associated with the first connection, displaying the UI object indicating the first connection between the wearable device and the first external electronic device, wherein the event associated with the first connection comprises at least one of:

receiving an input with respect to a visual object used for establishing the first connection between the wearable device and the first external electronic device, receiving, from a third external electronic device connected to the wearable device, information confirming whether connection to the first external electronic device or the wearable device is available, an execution of a function for performing multiple connections, or an input for changing a state of the first connection.

19. A non-transitory computer-readable storage medium storing one or more programs including instructions that, when individually or collectively executed by at least one processor of a wearable device comprising a display, a camera, and communication circuitry, the wearable device to:

identify a plurality of external electronic devices including a first external electronic device and a second external electronic device, using the communication circuitry;

establish a first connection between the wearable device and the first external electronic device, using the communication circuitry;

obtain an image through the camera;

based on the first connection, display, through the display, a user interface (UI) object superimposed on the image obtained through the camera for indicating that the first connection is established between the wearable device and the first external electronic device, wherein the UI object is visually connected with a first visual object representing the first external electronic device included in the image;

obtain an input for moving the UI object for changing a connection device of the first external electronic device; and based on movement of the UI object caused by the input being identified as visually connecting the first visual object representing the first external electronic device and a second visual object representing electronic device to the second external electronic device, transmit signals to the first external electronic device and the second external electronic device for a second connection between the first external electronic device and the second external electronic device.

20. The non-transitory computer-readable storage medium of claim 19, wherein the instructions, when individually or collectively executed by the at least one processor, cause the wearable device to:

transmit, to each of the plurality of external electronic devices, a connection signal;

receive, from the first external electronic device, a response signal of the connection signal; and establish the first connection, based on the response signal of the connection signal.

* * * * *